(12) United States Patent
Shirota et al.

(10) Patent No.: US 10,649,694 B2
(45) Date of Patent: May 12, 2020

(54) MANAGEMENT DEVICE AND INFORMATION PROCESSING DEVICE

(71) Applicant: Kabushiki Kaisha Toshiba, Minato-ku (JP)

(72) Inventors: Yusuke Shirota, Yokohama (JP); Tatsunori Kanai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/117,806

(22) Filed: Aug. 30, 2018

(65) Prior Publication Data

US 2019/0286368 A1 Sep. 19, 2019

(30) Foreign Application Priority Data

Mar. 16, 2018 (JP) .................................. 2018-050072

(51) Int. Cl.
*G06F 3/06* (2006.01)

(52) U.S. Cl.
CPC .......... *G06F 3/0659* (2013.01); *G06F 3/0616* (2013.01); *G06F 3/0679* (2013.01)

(58) Field of Classification Search
CPC ................................................ G06F 12/0246
See application file for complete search history.

(56) References Cited

U.S. PATENT DOCUMENTS

| 2013/0121075 A1* | 5/2013 | Hutchison | ........... G11C 11/5628 365/185.11 |
| 2014/0047229 A1* | 2/2014 | Wiseman | ................ G06F 13/14 713/2 |
| 2015/0347296 A1* | 12/2015 | Kotte | .................. G06F 12/0269 711/103 |

FOREIGN PATENT DOCUMENTS

JP 2008-146255 6/2008

OTHER PUBLICATIONS

Freitas, R., et al. "Storage-class memory: The next storage system technology", IBM Journal of Research and Development, vol. 52, No. 4, 2008, pp. 439-447.

* cited by examiner

*Primary Examiner* — Edward J Dudek, Jr.
(74) *Attorney, Agent, or Firm* — Oblon, McClelland, Maier & Neustadt, L.L.P.

(57) ABSTRACT

A management device is configured to control reading and writing of data as performed by a processing circuit with respect to a nonvolatile memory. The management device includes circuitry configured to: in response to a request from the processing circuit, perform writing or reading with respect to the nonvolatile memory; in response to writing with respect to the nonvolatile memory, update a table indicating a rewriting count for each area in the nonvolatile memory; detect writing having a high degree of locality representing rewriting operation performed to an extent equal to or greater than a reference value, with respect to the same area in the nonvolatile memory by refer to the table; and identify an area under attack in which the writing having the high degree of locality is performed.

13 Claims, 20 Drawing Sheets

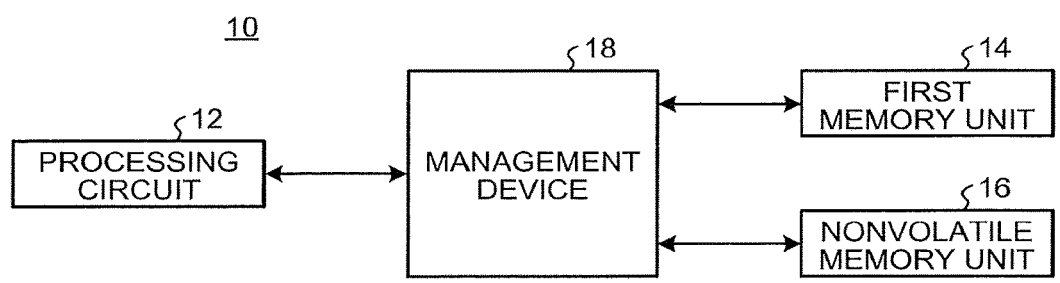
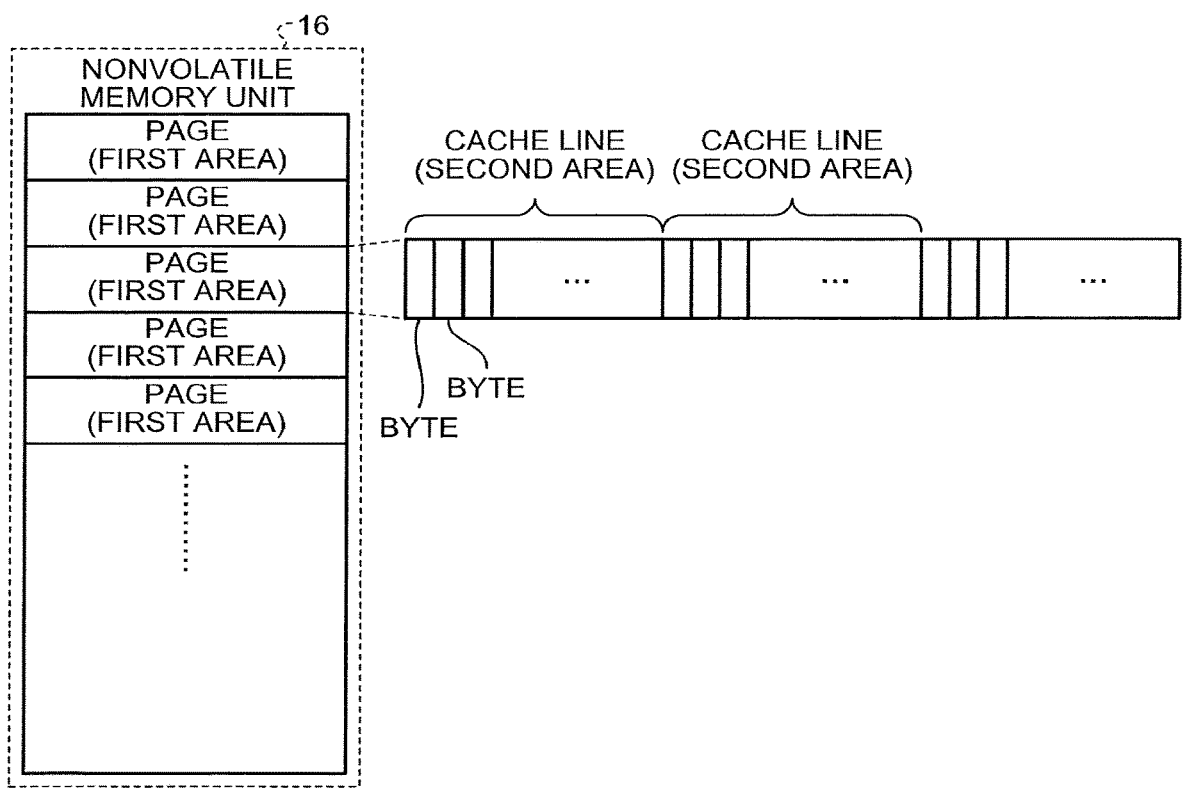

FIG.8

COUNTER TABLE

| PAGE NUMBER (IDENTIFICATION INFORMATION) | COUNTER VALUE |
|---|---|
| 0 | 5 |
| 1 | 2 |
| 2 | 1 |
| 3 | 3 |
| ⋮ | ⋮ |

FIG.9

MANAGEMENT TABLE

| ENTRY NUMBER | PAGE NUMBER (IDENTIFICATION INFORMATION) | MAPPING INFORMATION CACHE LINE NUMBER | | | | | | |
|---|---|---|---|---|---|---|---|---|
| | | 0 | 1 | 2 | 3 | 4 | 5 | ......... |
| 0 | 5 | 0 | 1 | 1 | 0 | 0 | 1 | ......... |
| 1 | 2 | 1 | 0 | 0 | 0 | 0 | 0 | ......... |
| 2 | 12 | 0 | 0 | 0 | 0 | 1 | 0 | ......... |
| 3 | 3 | 0 | 0 | 1 | 0 | 0 | 0 | ......... |
| ⋮ | ⋮ | | | | | | | |
| 63 | 4 | 0 | 0 | 1 | 0 | 0 | 1 | ......... |

FIG.16

MANAGEMENT TABLE

| ENTRY NUMBER | PAGE NUMBER (IDENTIFICATION INFORMATION) | MAPPING INFORMATION CACHE LINE NUMBER | | | | | | | WRITING COUNT WITHIN PREDETERMINED PERIOD OF TIME |
|---|---|---|---|---|---|---|---|---|---|
| | | 0 | 1 | 2 | 3 | 4 | 5 | ... | |
| 0 | 5 | 0 | 1 | 1 | 0 | 0 | 1 | ...... | 0 |
| 1 | 2 | 1 | 0 | 0 | 0 | 0 | 0 | ...... | 0 |
| 2 | 12 | 0 | 0 | 0 | 0 | 1 | 0 | ...... | 0 |
| 3 | 3 | 0 | 0 | 1 | 0 | 0 | 0 | ...... | 7 |
| ... | ... | | | | | | | ...... | ... |
| 63 | 4 | 0 | 0 | 1 | 0 | 0 | 1 | ...... | 0 |

COUNTER TABLE

| PAGE NUMBER (IDENTIFICATION INFORMATION) | COUNTER VALUE | WRITING COUNT WITHIN PREDETERMINED PERIOD OF TIME |
|---|---|---|
| 0 | 5 | 0 |
| 1 | 2 | 0 |
| 2 | 1 | 0 |
| 3 | 3 | 7 |
| ⋮ | ⋮ | ⋮ |

TLB | MAPPING INFORMATION

| LOGICAL ADDRESS | PHYSICAL ADDRESS |
|---|---|
|  |  |
|  |  |
|  |  |

MANAGEMENT DEVICE AND INFORMATION PROCESSING DEVICE

CROSS-REFERENCE TO RELATED APPLICATIONS

This application is based upon and claims the benefit of priority from Japanese Patent Application No. 2018-050072, filed on Mar. 16, 2018; the entire contents of which are incorporated herein by reference.

FIELD

Embodiments described herein relate generally to a management device, and an information processing device.

BACKGROUND

A nonvolatile memory such as a flash memory has restriction on the writing count. Hence, an information processing device that includes a nonvolatile memory performs wear levelling control with respect to the nonvolatile memory. For example, the information processing device manages the writing count either in units of pages representing the units for writing or in units of blocks that are larger than the pages, and writes data averagely on a page-by-page basis. As a result, the information processing device can extend the life of the nonvolatile memory.

In recent years, a high-speed nonvolatile memory called a storage class memory has been developed. In a storage class memory, in addition to enabling writing of data in units of pages, data can also be written in, for example, units of bytes that are smaller than pages. Such a nonvolatile memory in which data can be written in units of bytes can be used as the main memory device that serves as the work area for a central processing unit (CPU).

When a nonvolatile memory functions as a main memory device of the CPU, it gets directly accessed in units of cache lines or in units of bytes in response to a store instruction or a load instruction issued by the CPU. Hence, in case the CPU runs a malicious computer program that causes writing at particular addresses in a local manner (i.e., causes a high volume of writing in the same area within a short period of time), there is a risk that the nonvolatile memory cannot function normally. Thus, an information processing device having a nonvolatile memory as the main memory device needs to be equipped with a security function for detecting unauthorized writing at particular memory addresses.

In order to detect local writing at particular addresses, the information processing device needs to accurately count the volume of writing performed at the concerned addresses of the nonvolatile memory. However, because of task of counting the writing count in units of cache lines or units of bytes, the structure for management becomes a complex and large-scale structure, thereby resulting in an increase in the cost of the information processing device. Hence, an information processing device needs to be able to accurately detect, at low cost, local writing performed in the nonvolatile memory.

Moreover, in case unauthorized writing at particular memory addresses is detected, the information processing device needs to prevent a situation in which the nonvolatile memory does not function normally. Thus, in the information processing device that includes a nonvolatile memory as the main memory device, in case unauthorized writing is detected at particular memory addresses of the nonvolatile memory, the information processing device needs to be equipped with a security function for preventing a situation in which the nonvolatile memory does not function normally.

BRIEF DESCRIPTION OF THE DRAWINGS

FIG. 1 is a diagram illustrating an exemplary hardware configuration of an information processing device;

FIG. 2 is a diagram illustrating a configuration of a nonvolatile memory unit;

FIG. 8 is a diagram illustrating an example of a counter table;

FIG. 9 is a diagram illustrating an example of a management table;

FIG. 16 is a diagram illustrating a modification example of the management table;

DETAILED DESCRIPTION

Figure 3:
FIG. 3 is a diagram illustrating an example of address information.

According to an embodiment, a management device is configured to control reading and writing of data as performed by a processing circuit with respect to a nonvolatile memory. The management device includes circuitry. The circuitry is configured to, in response to a request from the processing circuit, perform writing or reading with respect to the nonvolatile memory. The circuitry is configured to, in response to writing with respect to the nonvolatile memory, update a table indicating a writing count for each area in the nonvolatile memory. The circuitry is configured to detect writing having a high degree of locality representing writing operation performed to an extent equal to or greater than a reference value, with respect to the same area in the nonvolatile memory by referring to the table. The circuitry is configured to identify an area under attack in which the writing having the high degree of locality is performed.

Exemplary embodiments of an information processing device 10 are described below in detail with reference to the accompanying drawings. Although the following explanation is given about a plurality of embodiments, the constituent elements having substantially identical functions and configuration are referred to by the same reference numerals, and the redundant explanation is not repeated from the second embodiment onward.

First Embodiment

FIG. 1 is a diagram illustrating an exemplary hardware configuration of the information processing device 10. The information processing device 10 includes a processing circuit 12, a first memory unit 14, a nonvolatile memory unit 16, and a management device 18.

The processing circuit 12 includes one or more processors. A processor implies, for example, a central processing unit (CPU). Moreover, a processor can include one or more CPU cores. The processing circuit 12 executes computer programs and processes data. In response to the execution of a computer program, the processing circuit 12 reads data from the first memory unit 14 or the nonvolatile memory unit 16, and writes data in the first memory unit 14 or the nonvolatile memory unit 16.

Moreover, the processing circuit 12 includes hierarchical cache memories such as L1 data cache, L1 instruction cache, L2 cache, and L3 cache. The processing circuit 12 uses such cache memories for temporarily storing the data that was stored in the first memory unit 14 or the nonvolatile memory unit 16. For example, if there occurs a cache miss in the last level cache of the hierarchical caches, then the processing circuit 12 accesses the first memory unit 14 or the nonvolatile memory unit 16 in units of cache lines, and performs reading and writing of the necessary data.

Meanwhile, the processing circuit 12 can be any type of circuit as long as it is capable of performing data processing. For example, the processing circuit 12 can be a graphic processing unit (GPU) used in general-purpose computing on graphic processing unit (GPGPU). Alternatively, the processing circuit 12 can be an accelerator such as a field programmable gate array (FPGA).

The first memory unit 14 represents the main memory device (main memory) that is used as the work area of the processing circuit 12. For example, the first memory unit 14 is a volatile memory unit from which the stored data gets deleted when the power supply is stopped. For example, the first memory unit 14 is a dynamic random access memory (DRAM). Alternatively, the first memory unit 14 can be a nonvolatile memory such as a magnetoresistive random access memory (MRAM) that is accessible at high speeds in an identical manner to a DRAM.

The first memory unit 14 has a higher writable count than the nonvolatile memory unit 16. For example, the first memory unit 14 has such a high writable count that it need not be taken into account at the design stage (for example, such a high writable count that the design can be done without any restrictions on the writable count).

The nonvolatile memory unit 16 is a memory in which the data remains stored even if the power supply is stopped. Herein, the nonvolatile memory unit 16 along with the first memory unit 14 constitutes the main memory device of the processing circuit 12.

The nonvolatile memory unit 16 includes, for example, a nonvolatile memory having a larger memory capacity and a higher speed than a DRAM. Examples of the nonvolatile memory unit 16 include an MRAM, a phase change memory (PCM), a phase random access memory (PRAM), a phase change random access memory (PCRAM), a resistance change random access memory (ReRAM), a ferroelectric random access memory (FeRAM), and what is called a storage class memory (SCM) such as 3DXPoint or Memristor. Alternatively, the nonvolatile memory unit 16 can be a module in which a plurality of semiconductor devices is installed in a single substrate or housing.

The nonvolatile memory unit 16 has a greater memory capacity than the first memory unit 14. Alternatively, the nonvolatile memory unit 16 can have the same memory capacity as the first memory unit 14. Moreover, the access speed of the nonvolatile memory unit 16 is equivalent to or slightly slower than the access speed of the first memory unit 14. Furthermore, the nonvolatile memory unit 16 has zero standby electricity or requires extremely low standby electricity as compared to the first memory unit 14. As an example, the nonvolatile memory unit 16 has the access latency in the range of 10 nanoseconds to few microseconds.

The nonvolatile memory unit 16 enables writing and reading of data in units of bytes or in units of small areas. Hence, the processing circuit 12 can directly access the nonvolatile memory unit 16 using a load instruction or a store instruction. For example, the processing circuit 12 can directly access the nonvolatile memory unit 16 in units of cache lines.

The management device 18 controls the reading and writing of data performed by the processing circuit 12 with respect to the first memory unit 14 and the nonvolatile memory unit 16. The management device 18 processes the access requests issued by the processing circuit 12 with respect to the first memory unit 14 and the nonvolatile memory unit 16. That is, in response to a write instruction received from the processing circuit 12, the management device 18 writes data in the first memory unit 14 or the nonvolatile memory unit 16. Similarly, in response to a read instruction received from the processing circuit 12, the management device 18 reads data from the first memory unit 14 or the nonvolatile memory unit 16, and sends the read data to the processing circuit 12.

Moreover, the management device 18 performs wear leveling control with respect to the nonvolatile memory unit 16. More particularly, the management device 18 manages the data writing count in each area of the nonvolatile memory unit 16. Then, based on the area-by-area writing counts, the management device 18 controls the data writing positions in such a way that the data gets written averagely across the entire area of the nonvolatile memory unit 16.

The management device 18 is a memory controller configured in some different hardware than the processing circuit 12. Alternatively, the management device 18 can be configured as part of the hardware of the processing circuit (for example, a circuit formed on the same semiconductor substrate as the processing circuit 12), or can be implemented by using a combination of some of the hardware of the processing circuit 12 and a memory controller. Still alternatively, the management device 18 can be implemented using some of the functions of the operating system run by the processing circuit 12; or can be implemented using a combination of some of the functions of the operating system, which is run by the processing circuit 12, and a memory controller.

Still alternatively, the management device 18 can be a memory management unit (MMU) that is configured using some different hardware than the processing circuit 12. Still alternatively, the management device 18 can be implemented using a combination of some of the hardware of the processing circuit 12 and a memory management unit. Still alternatively, the management device 18 can be implemented using a combination of some of the functions of the operating system, which is run by the processing circuit 12, and a memory management unit.

Still alternatively, the management device 18 can be implemented using a combination of a memory controller and an MMU. Still alternatively, the management device 18 can be implemented using a combination of some of the hardware of the processing circuit 12, a memory controller, and a memory management unit. Still alternatively, the management device 18 can be implemented using a combination of some of the functions of the operating system run by the processing circuit 12; a memory controller; and a memory management unit.

FIG. 2 is a diagram illustrating a configuration of the nonvolatile memory unit 16. The nonvolatile memory unit 16 includes a plurality of pages (first areas). A page corresponds to a data unit managed by the processing circuit 12. For example, a page corresponds to a page of a virtual memory device managed by the operating system. A page can be of 4 kilobytes in size, for example.

Each of a plurality of pages includes a plurality of cache lines (second areas). A cache line represents a unit for writing of data with respect to the cache memory in the processing circuit 12. The processing circuit 12 performs data writing and data reading with respect to the nonvolatile memory unit 16 in units of cache lines. Moreover, the processing circuit 12 can perform data writing and data reading in units of pages too.

A cache line is of 64 bytes in size, for example. Meanwhile, a second area can be a smaller unit than a cache line (for example, can be a unit of bytes), or can be made of a plurality of cache lines.

FIG. 3 is a diagram illustrating an example of address information. For example, the management device 18 obtains, from the processing circuit 12, address information divided into three bit fields as illustrated in FIG. 3.

The higher-level bit field of the address information indicates the position of the page for data writing or the page for data reading (i.e., indicates the position of the target page). The middle-level bit field of the address information indicates the position of the cache line for data writing or data reading (i.e., indicates the position of the target cache line). The lower-level bit field of the address information indicates the positions of the bytes for data writing or data reading in the target cache line.

Figure 4:
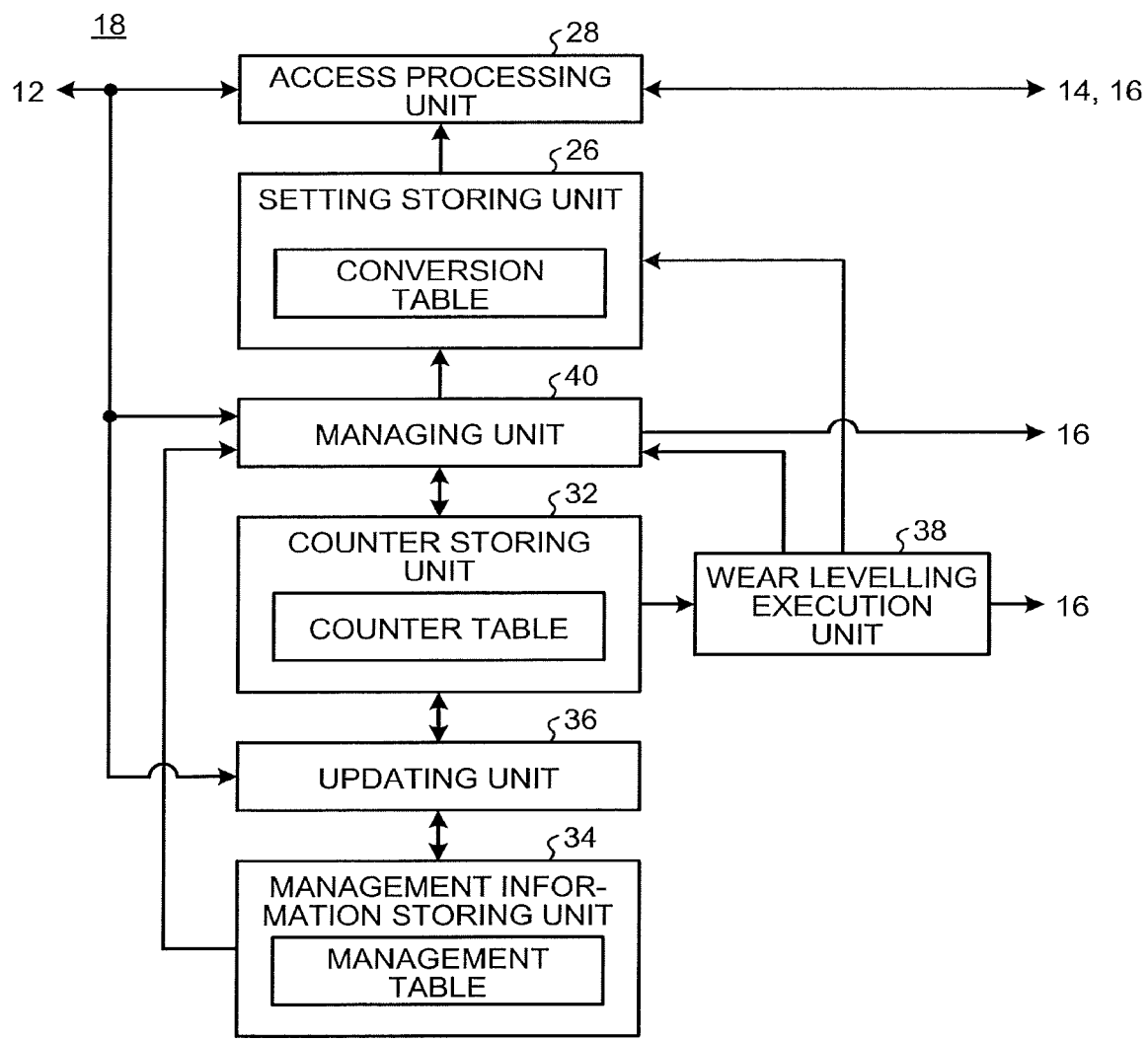
FIG. 4 is a diagram illustrating a configuration of a management device according to a first embodiment.

FIG. 4 is a diagram illustrating a configuration of the management device 18. Herein, the management device 18 includes a setting storing unit 26, an access processing unit 28, a counter storing unit 32, a management information storing unit 34, an updating unit 36, a wear levelling execution unit 38, and a managing unit 40.

The setting storing unit 26 is used to store a conversion table. In the conversion table, regarding each page for which an access request is issued by the processing circuit 12, the correspondence relationship between the requested address and the page number (physical address) of the concerned page in either the first memory unit 14 or the nonvolatile memory unit 16 is stored.

Moreover, in the conversion table, regarding each page for which an access request is issued by the processing circuit 12, an access method is stored that indicates whether a first access process or a second access process is to be performed.

In the first access process, writing and reading is performed with respect to the data transferred from the nonvolatile memory unit 16 to the first memory unit 14. In the second access process, writing and reading is performed directly with respect to the data stored in the nonvolatile memory unit 16. Regarding the details of the conversion table, the explanation is given later with reference to FIG. 5.

The access processing unit 28 processes the access requests issued by the processing circuit 12 with respect to the first memory unit 14 and the nonvolatile memory unit 16. That is, in response to a write instruction issued by the processing circuit 12, the access processing unit 28 writes data in the first memory unit 14 or the nonvolatile memory unit 16. Moreover, in response to a read instruction issued by the processing circuit 12, the access processing unit 28 reads data from the first memory unit 14 or the nonvolatile memory unit 16, and sends the read data to the processing circuit 12.

Furthermore, regarding the page for which an access request is issued by the processing circuit 12, the access processing unit 28 accesses the first memory unit 14 and the nonvolatile memory unit 16 according to the access method stored in the conversion table. That is, when a write request or read request is received with respect to a page set to the first access process, the access processing unit 28 performs the first access process. Similarly, when a write request or a read request is received with respect to a page set to the second access process, the access processing unit 28 performs the second access process. Regarding the details of the access methods, the explanation is given later with reference to FIGS. 5 to 7.

The counter storing unit 32 is used to store a counter table. In the counter table, regarding each of a plurality of pages included in the nonvolatile memory unit 16, a counter value indicating the data writing count is stored. Regarding the details of the counter table, the explanation is given later with reference to FIG. 8.

The management information storing unit 34 is used to store a management table. Regarding the details of the management table, the explanation is given later with reference to FIG. 9.

The updating unit 36 updates the counter values stored in the counter table, as well as updates the management table. When the processing circuit 12 writes data in the nonvolatile memory unit 16, the updating unit 36 obtains the address information of the written data, and updates the counter table and the management table based on the obtained address information. Regarding the specific sequence of processes performed by the updating unit 36, the explanation is given later with reference to FIGS. 10 and 11.

The wear levelling execution unit 38 performs wear levelling control with respect to the nonvolatile memory unit 16 based on the page-by-page counter values stored in the counter storing unit 32. The wear levelling execution unit 38 controls the placement of data in the nonvolatile memory unit 16 in such a way that the data is averagely written across the entire area of the nonvolatile memory unit 16. Regarding the processes performed by the wear levelling execution unit 38, further explanation is given later with reference to FIG. 12.

The managing unit 40 detects the writing having a high degree of spatial and temporal locality in the nonvolatile memory unit 16. That is, the managing unit 40 detects, as the writing having a high degree of locality, writing operations performed to the extent equal to or greater than a reference value, with respect to the same area in the nonvolatile memory unit 16. Then, the managing unit 40 identifies the area under attack in which the writing having a high degree of locality was performed. Moreover, when the writing having a high degree of locality is detected, the managing unit 40 performs an avoidance process for avoiding a situation in which the nonvolatile memory unit 16 stops functioning normally. Regarding the detailed configuration and process of the managing unit 40, further explanation is given later with reference to FIG. 13.

Moreover, during the normal operations, the managing unit 40 can perform a switching process for changing the access method stored in the conversion table. For example, when the volume of writing in the nonvolatile memory unit 16 is greater than a set value, the managing unit 40 selects one of the target pages for swapping set to the second access process from among a plurality of pages managed in the conversion table. Then, the managing unit 40 switches the access method for the selected target page for swapping from the second access process to the first access process.

Figure 5:
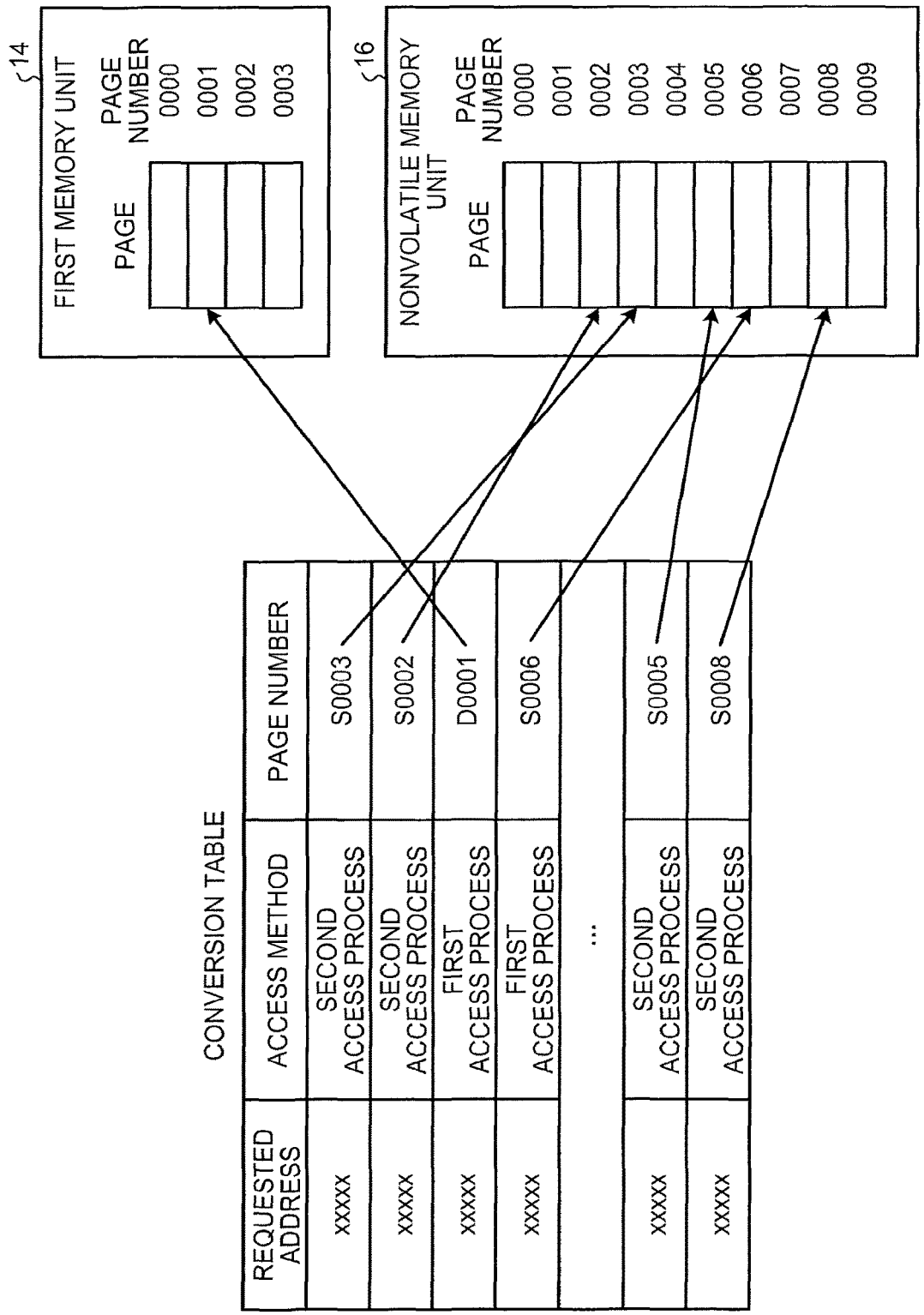
FIG. 5 is a diagram illustrating an example of a conversion table.

FIG. 5 is a diagram illustrating an example of the conversion table. In the conversion table, regarding each page for which an access request is issued by the processing circuit 12, the correspondence relationship between the requested address and the page number (physical address) of the concerned page in either the first memory unit 14 or the nonvolatile memory unit 16 is stored. That is, in the conversion table, mapping information is stored that indicates such pages in either the first memory unit 14 or the nonvolatile memory unit 16 in which the data corresponding to the addresses requested by the processing circuit 12 has been stored.

For example, in the example illustrated in FIG. 5, the pages having "Sxxxx" written in the column of page numbers in the conversion table indicate the pages having page numbers "xxxx" in the nonvolatile memory unit 16. For example, in the example illustrated in FIG. 5, the pages having "Dxxxx" written in the column of page numbers indicate the pages having page numbers "xxxx" in the first memory unit 14. Herein, x represents an arbitrary value.

Moreover, in the conversion table, regarding each page for which an access request is issued by the processing circuit 12, the access method is stored that indicates whether the first access process or the second access process is to be performed. Meanwhile, the conversion table is not limited to have the configuration illustrated in FIG. 5, and can alternatively have some other configuration.

Figure 6:
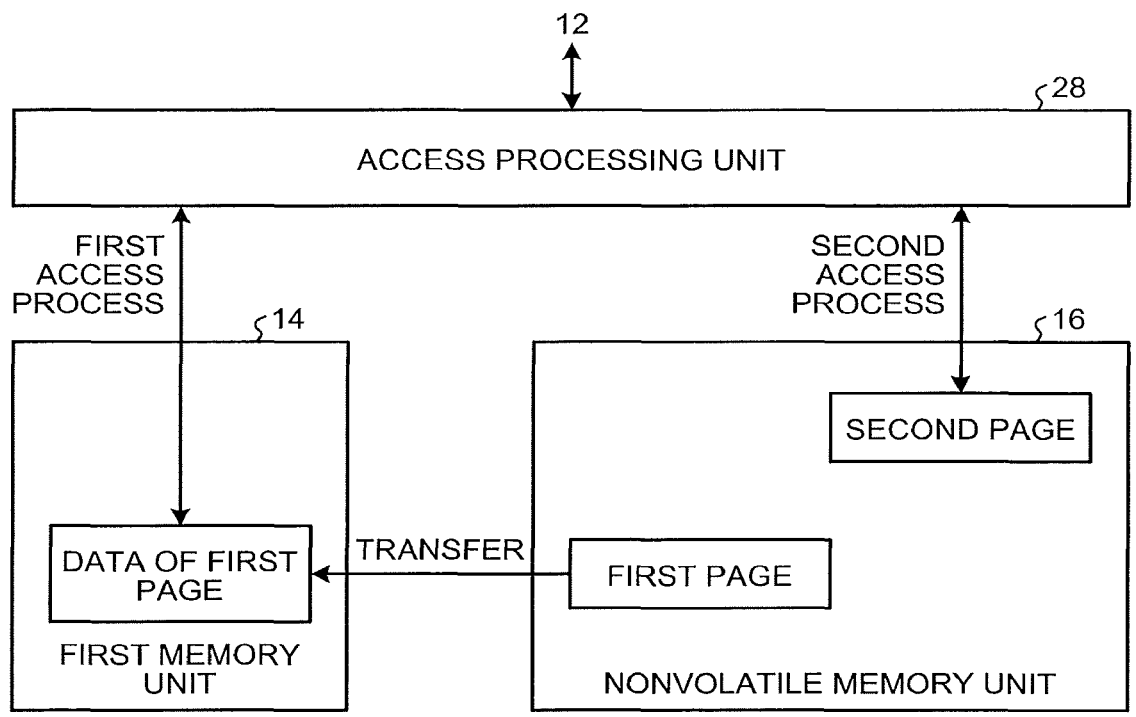
FIG. 6 is a diagram illustrating the details of a first access process and a second access process.

FIG. 6 is a diagram illustrating the details of the first access process and the second access process. When a write request or a read request is received with respect to a first page set to the first access process, the access processing unit 28 performs the first access process with respect to the nonvolatile memory unit 16.

For example, as illustrated in FIG. 6, in the first access process, the access processing unit 28 transfers all of the data stored in the first page of the nonvolatile memory unit 16 and stores the data in the first memory unit 14. As a result, a copy of the data that was stored in the first page of the nonvolatile memory unit 16 can be stored in the first memory unit 14. Then, in the first access process, the access processing unit 28 performs reading and writing with respect to the data that has been transferred from the nonvolatile memory unit 16 and stored in the first memory unit 14. For example, with respect to the data transferred from the nonvolatile memory unit 16 to the first memory unit 14, the access processing unit 28 performs reading and writing in units having a smaller size than a page (for example, in units of cache lines of the processor). Subsequently, in the first access process, when no more free memory space is available in the first memory unit 14 so that no more data can be transferred from the nonvolatile memory unit 16 to the first memory unit 14 as well as when it is determined unnecessary to keep the data stored in the first memory unit 14; the access processing unit 28 writes the data, which was transferred to the first memory unit 14, back in the first page of the nonvolatile memory unit 16.

Alternatively, the access processing unit 28 can write the data, which was transferred to the first memory unit 14, back to a location other than the first page (i.e., other than the same location). For example, in the first access process, the access processing unit 28 can write the data, which was transferred from the nonvolatile memory unit 16 to the first memory unit 14, back to an unused page not having any requested address associated thereto. As a result, the access processing unit 28 can reduce the differences among the page-by-page writing counts and can prevent deterioration of quality in particular pages.

Meanwhile, when a write request or a read request is received with respect to a second page set to the second access process, the access processing unit 28 performs the second access process with respect to the nonvolatile memory unit 16.

For example, as illustrated in FIG. 6, in the second access process, the access processing unit 28 performs reading and writing directly with respect to the second page of the nonvolatile memory unit 16. For example, the access processing unit 28 performs reading and writing in units having a smaller size than a page.

In this way, the access processing unit 28 accesses the nonvolatile memory unit 16 according to two access methods. For example, when an application having a high degree of locality regarding memory accesses is executed, the access processing unit 28 implements the first access process to access the pages stored in the nonvolatile memory unit 16. As a result, when an application having a high degree of locality regarding memory accesses is executed, the access processing unit 28 can process the same page at a higher speed.

Meanwhile, for example, when a process such as random accessing having a low degree of locality regarding memory accesses is performed, the access processing unit 28 performs the second access process to access the pages stored in the nonvolatile memory unit 16. As a result, in the case of performing processes having a low degree of locality, the access processing unit 28 eliminates the overheads of transferring data from the nonvolatile memory unit 16 to the first memory unit 14, and can perform a process in an efficient manner. In this way, the access processing unit 28 can implement two types of access methods, namely, the first access process and the second access process, and can achieve efficiency in performing processes.

Figure 7:
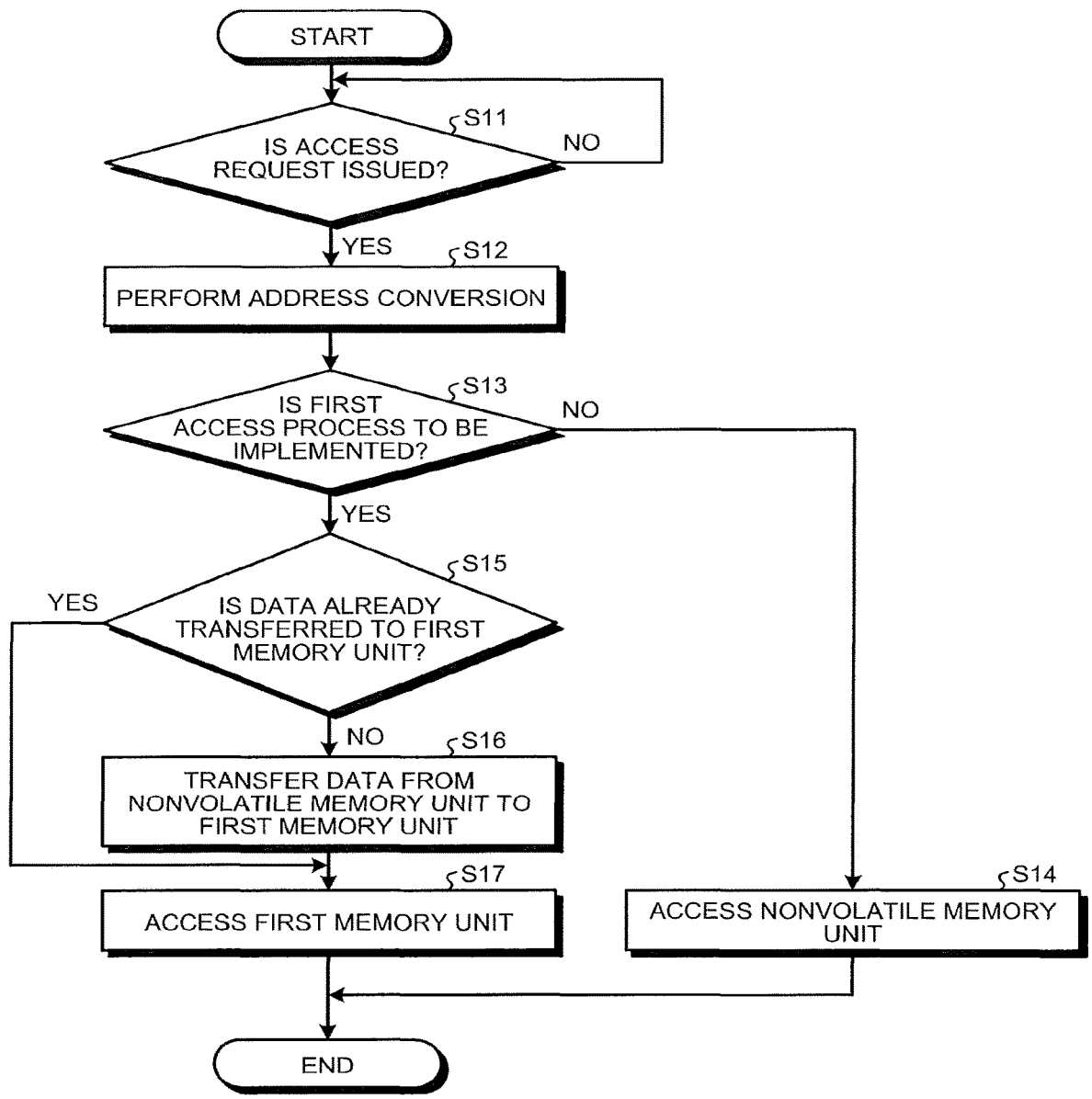
FIG. 7 is a flowchart for explaining access processing.

FIG. 7 is a flowchart for explaining the access processing performed by the access processing unit 28 according to the first embodiment. Thus, the access processing unit 28 according to the first embodiment accesses the first memory unit 14 and the nonvolatile memory unit 16 according to the flowchart illustrated in FIG. 7.

Firstly, at S11, the access processing unit 28 determines whether or not an access request is issued by the processing circuit 12. If there is no access request (No at S11), then the system control waits at S11. When an access request is issued (Yes at S11), the system control proceeds to S12.

At S12, the access processing unit 28 refers to the conversion table and, from the requested address specified in the access request, identifies the page number of the target page to be accessed in the first memory unit 14 or the nonvolatile memory unit 16. As a result, the access processing unit 28 can perform an address conversion process for converting the requested address into a physical address.

At S13, the access processing unit 28 determines whether or not the first access process is implemented as the access method with respect to the target page. If the first access process is not implemented as the access method with respect to the target page, that is, if the second access process is implemented as the access method (No at S13); then the system control proceeds to S14. At S14, the access processing unit 28 directly accesses the target page in the nonvolatile memory unit 16. When the process at S14 is finished, the access processing unit 28 ends the flow of processes.

If the first access process is implemented as the access method with respect to the target page (Yes at S13), the system control proceeds to S15. At S15, the access processing unit 28 determines whether or not the data is already transferred to the first memory unit 14. Herein, by referring to the page numbers (physical addresses) in the conversion table, the access processing unit 28 can determine whether or not the data is already transferred to the first memory unit 14. If the data is already transferred, then the system control proceeds to S17.

If the data is not yet transferred (no at S15), the system control proceeds to S16. At S16, the access processing unit 28 transfers the data of the target page to the first memory unit 14. Moreover, the access processing unit 28 changes the page number (physical address) of the transferred data in the conversion table to the page number of the destination in the first memory unit 14. When the process at S16 is finished, the system control proceeds to S17.

At S17, the access processing unit 28 accesses the target page in the first memory unit 14. When the process at S17 is finished, the access processing unit 28 ends the flow of processes. As a result of performing the processes described above, the access processing unit 28 can access the first memory unit 14 and the nonvolatile memory unit 16 according to the access method specified in the conversion table.

FIG. 8 is a diagram illustrating an example of the counter table. In the counter table, regarding each of a plurality of pages (first areas) included in the nonvolatile memory unit 16, a counter value indicating the data writing count is stored. For example, in the counter table, the counter values are stored in a corresponding manner to identification information (for example, the page numbers) of the pages included in the nonvolatile memory unit 16.

Each counter value can be expressed as the estimation value of the writing count of the corresponding page. Each counter value is set to, for example, "0" during initialization at the time of factory shipment. Then, each counter value gets incremented by one at a time by the updating unit 36.

FIG. 9 is a diagram illustrating an example of the management table. The management table includes a predetermined number of entries. For example, in the example illustrated in FIG. 9, the management table includes 64 entries.

In each entry, management information can be stored. That is, the management table can be used to store management information regarding each of a predetermined number of pages. The number of sets of management information that can be stored in the management table is smaller than the number of pages included in the nonvolatile memory unit 16. The management table is used to store the management information regarding the recently-accessed pages in the nonvolatile memory unit 16 as accessed by the processing circuit 12. When the management table becomes full with entries; for example, the oldest management information (the management information having the longest elapsed time since being accessed) is deleted, and new management information is stored.

The management information contains identification information and mapping information.

The identification information represents a number (page number) enabling identification of the page managed using the concerned management information. By referring to the identification information, the updating unit 36 can determine the page that is managed using the management information stored at the concerned entry.

The mapping information indicates whether or not each of a plurality of cache lines (second areas) included in the concerned page already has data written therein. For example, when there is no data stored in the concerned page, the mapping information indicates that all cache lines included in that page are in the data-unwritten state. In the state in which there is no data stored in the concerned page, when data is written in any cache line, the mapping information indicates that the concerned cache line is in the data-written state and indicates that the remaining cache lines are in the data-unwritten state.

For example, the mapping information contains a single bit corresponding to each of a plurality of cache lines included in a page. For example, when there are 64 cache lines included in a single page, the mapping information contains 64 bits. For example, when a bit indicates "1", it implies that the corresponding cache line already has data written therein. For example, when a bit indicates "0", it implies that the corresponding cache line does not have data written therein.

Meanwhile, in the management table, the management information need not be stored in all entries. That is, there can be unused entries too in the management table.

Figure 10:
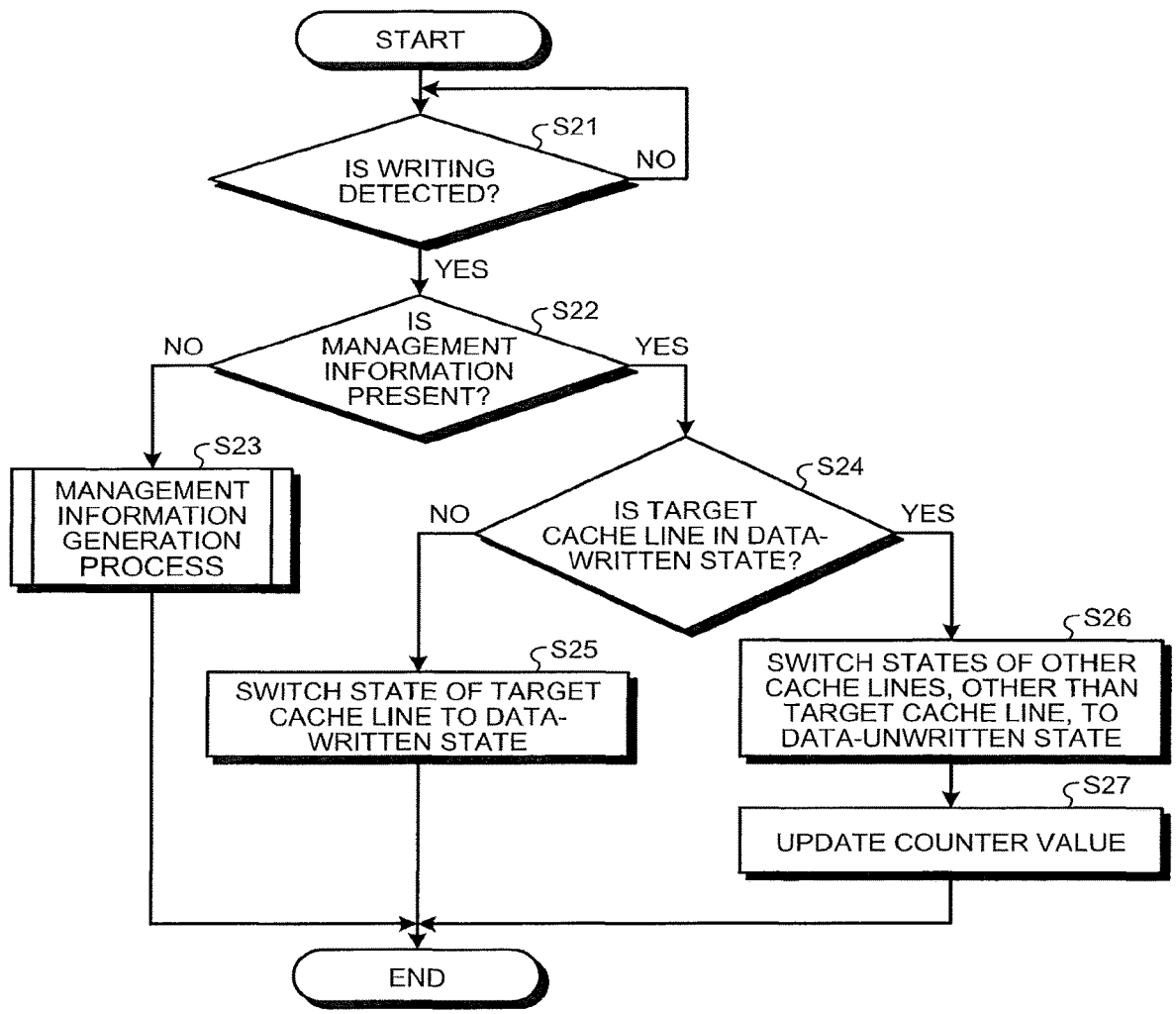
FIG. 10 is a flowchart for explaining a flow of processes performed by an updating unit.

FIG. 10 is a flowchart for explaining a flow of a process performed by the updating unit 36. Thus, the updating unit 36 updates the counter table and the management table according to the flowchart illustrated in FIG. 10.

Firstly, at S21, the updating unit 36 detects whether or not data would be written in the nonvolatile memory unit 16. If it is detected that data would not be written (No at S21), then the system control waits at S21. When it is detected that data would be written (Yes at S21), the system control proceeds to S22.

At S22, the updating unit 36 determines whether or not management information about the target page (the target first area), in which the target data for writing (the first data) would be written, is present in the management table.

If the management information about the target page is not present in the management table (No at S22), then the system control proceeds to S23. At S23, the updating unit 36 performs a management information generation process. The explanation of the management information generation process is given later with reference to FIG. 11. When the management information generation process is finished, the updating unit 36 ends the flow of processes and waits for the next instance of writing.

Meanwhile, if the management information about the target page is present in the management table (Yes at S22), the system control proceeds to S24.

At S24, the updating unit 36 refers to the management information about the target page, and determines whether the target cache line (the target second area), in which the first data would be written, is in the data-written state or the data-unwritten state. For example, the updating unit 36 refers to the mapping information in the management information about the target page, and determines whether or not the bit corresponding to the target cache line is "1".

If the target cache line is in the data-unwritten state (No at S24), the system control proceeds to S25. At S25, the updating unit 36 changes the state of the target cache line, which is specified in the management information about the target page, from the data-unwritten state to the data-written state. For example, the updating unit 36 changes the concerned bit from "0" to "1". As a result, the updating unit 36 can reflect, in the management table, the state of the nonvolatile memory unit 16 after the first data has been written. When the process at S25 is finished, the updating unit 36 ends the flow of processes and waits for the next instance of writing.

When the target cache line is in the data-written state, that is, for example, when the bit corresponding to the target cache line is "1" (Yes at S24); the system control proceeds to S26. At S26, the updating unit 36 changes the state of the other cache lines, other than the target cache line specified in the management information about the target page, to the data-unwritten state. That is, the updating unit 36 sets only the target cache line, which is specified in the management information about the target page, to have the data-written state; and sets the other cache lines to have the data-unwritten state. For example, the updating unit 36 sets only the concerned bit to "1" and sets the other bits to "0".

As a result, the updating unit 36 can reflect, in the management table, the state of the nonvolatile memory unit 16 after the first data has been written in the target cache line.

After the process at S26 is finished, the system control proceeds to S27. At S27, the updating unit 36 updates the counter value regarding the target page. For example, the updating unit 36 increments by one the counter value corresponding to the page number specified in the address information. As a result, the updating unit 36 can update the writing count of the target page.

Meanwhile, the updating unit 36 can perform the processes at S26 and S27 in reverse order. When the operations at S26 and S27 are finished, the updating unit 36 ends the flow of operations and waits for the next instance of writing.

Figure 11:
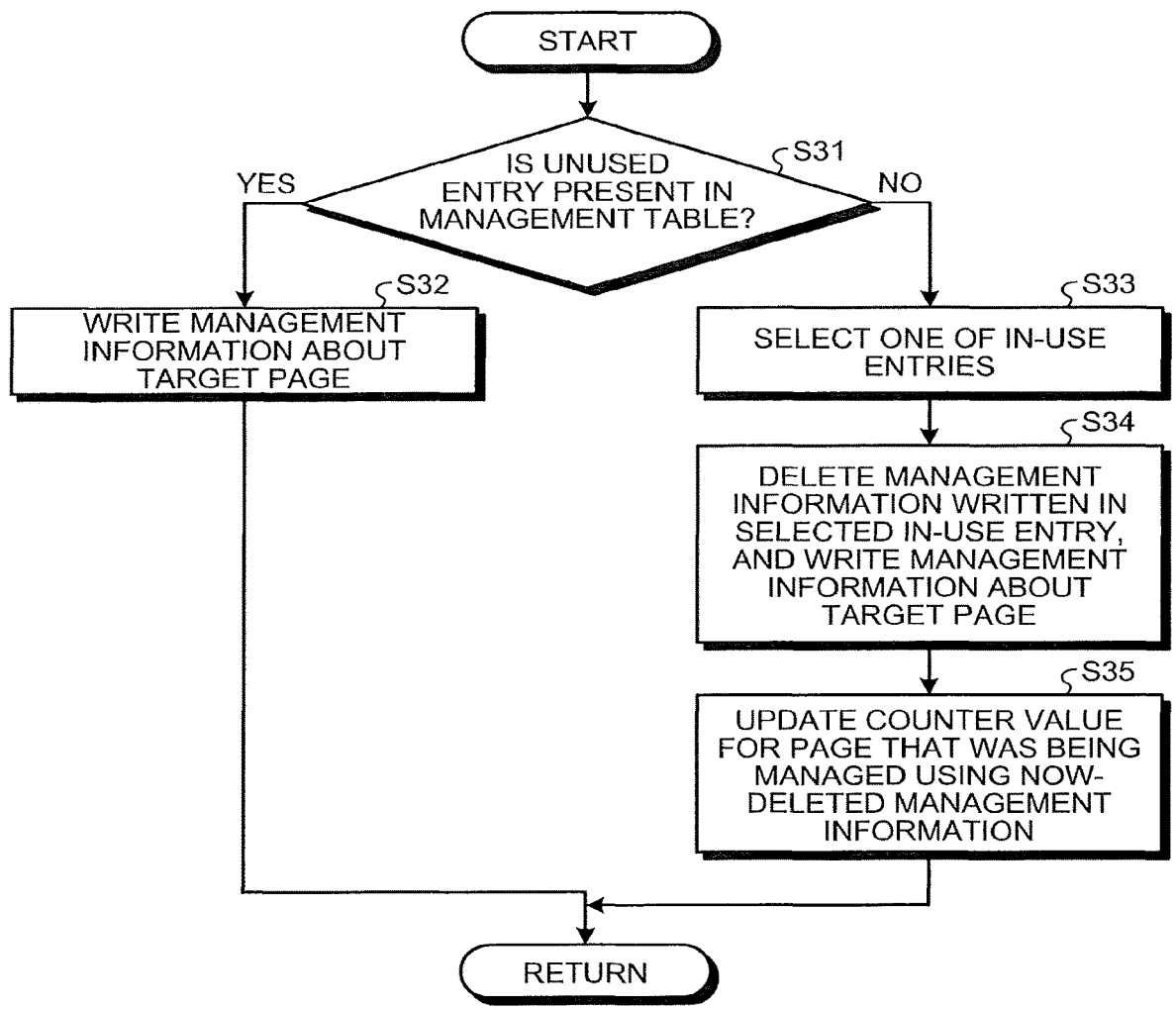
FIG. 11 is a flowchart for explaining a flow of a management information generation process performed by the updating unit.

FIG. 11 is a flowchart for explaining a flow of the management information generation process performed by the updating unit 36. Thus, in the management information generation process performed at S23 illustrated in FIG. 10, the updating unit 36 performs processes from S31 to S35 illustrated in FIG. 11.

Firstly, at S31, the updating unit 36 determines whether or not there is any unused entry in the management table. That is, the updating unit 36 determines whether or not the management table includes any entry in which management information is not stored.

When there is an unused entry (Yes at S31), the system control proceeds to S32. At S32, the updating unit 36 writes management information about the target page in the unused entry. That is, the updating unit 36 writes, in the unused entry, management information that contains identification information enabling identification of the target page and contains mapping information indicating that only the target cache line is in the data-written state and the other areas are in the data-unwritten state.

As a result, the updating unit 36 can update, in the management table, the state of the nonvolatile memory unit 16 after the first data has been written. After the process at S32 is finished, the system control returns to the flow illustrated in FIG. 10.

Meanwhile, if no unused entry is present (No at S31), then the system control proceeds to S33. At S33, the updating unit 36 selects one of the in-use entries from the management table. For example, the updating unit 36 selects the in-use entry in which the oldest management information is stored. Alternatively, the updating unit 36 can select an in-use entry according to some other algorithm.

When the process at S33 is finished, the system control proceeds to S34. At S34, the updating unit 36 deletes the management information written in the selected in-use entry, and writes the management information about the target page. That is, the updating unit 36 overwrites, in the selected in-use entry, management information that contains identification information enabling identification of the target page and contains mapping information indicating that only the target cache line is in the data-written state and the other areas are in the data-unwritten state.

As a result, the updating unit 36 can delete the selected management information (for example, the oldest management information from the management table, and can store new management information in the management table. Then, the updating unit 36 can reflect, in the management table, the state of the nonvolatile memory unit 16 after the first data has been written therein.

After the process at S34 is finished, the system control proceeds to S35. At S35, the updating unit 36 updates the counter value for the page that was being managed using the management information now deleted from the management table. For example, in the counter table, the updating unit 36 increments by one the counter value corresponding to the page number specified in the deleted management information.

As a result of performing the process at S35, regarding a page for which management using the management table is no more performed, the updating unit 36 can update the writing count assuming that data has been added. As a result, the updating unit 36 can estimate the writing count for a page that is not being actively managed using the management table.

Meanwhile, the updating unit 36 can perform the processes at S34 and S35 in reverse order. When the processes at S34 and S35 are finished, the system control returns to the flowchart illustrated in FIG. 10.

As described above, the management device 18 stores a smaller number of sets of management information than the number of pages included in the nonvolatile memory unit 16. As a result, the management device 18 enables achieving reduction in the number of entries in the management table, thereby enabling achieving reduction in the memory space required for the management information storing unit 34.

Moreover, regarding a page not being managed using the management table, the management device 18 updates the counter value at the timing of deletion of the corresponding management information from the management table. As a result, the management device 18 can accurately estimate the writing count of all pages included in the nonvolatile memory unit 16.

Figure 12:
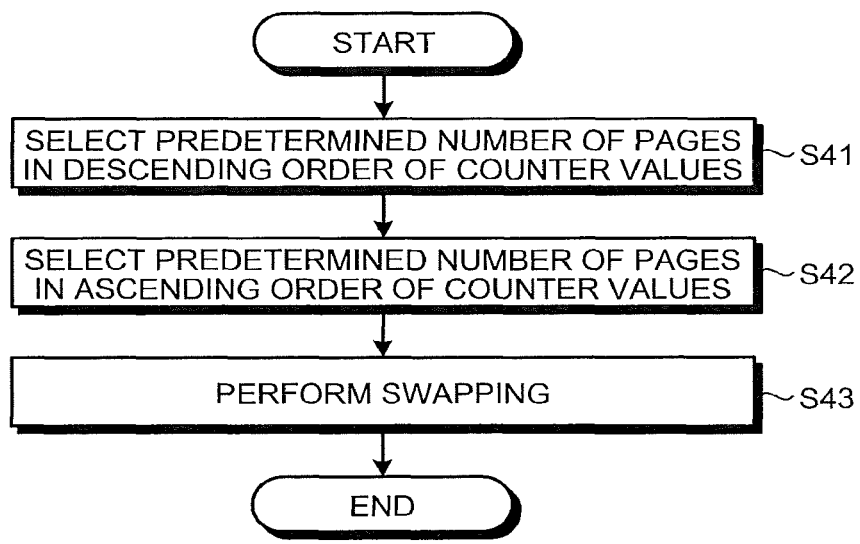
FIG. 12 is a flowchart for explaining a flow of a wear levelling process.

FIG. 12 is a flowchart for explaining a flow of the wear levelling process performed by the wear levelling execution unit 38. Thus, the wear levelling execution unit 38 implements wear levelling according to the flowchart illustrated in FIG. 12.

For example, the wear levelling execution unit 38 periodically implements wear levelling according to the flowchart illustrated in FIG. 12. For example, every time the counter values in the counter table are updated a predetermined number of times, the wear levelling execution unit 38 implements wear levelling.

Firstly, at S41, the wear levelling execution unit 38 refers to the counter table and selects a predetermined number of pages in descending order of counter values. Then, at S42, the wear levelling execution unit 38 refers to the counter table and selects the same number of pages in ascending order of counter values.

Subsequently, at S43, the wear levelling execution unit 38 swaps, in the nonvolatile memory unit 16, the page positions of the data recorded in the predetermined number of pages in descending order of counter values with the page positions of the data recorded in the predetermined number of pages in ascending order of counter values. Moreover, at S43, the wear levelling execution unit 38 corrects, in the conversion table, the page numbers representing the physical addresses of the data for which the page positions are swapped.

As a result of performing the processes described above, based on the page-by-page writing counts estimated by taking into account the memory accesses in units of cache lines, the wear levelling execution unit 38 can control the data writing positions in such a way that the data gets written averagely across the entire area of the nonvolatile memory unit 16. Meanwhile, the wear levelling execution unit 38 can implement wear levelling according to some other processes other than the flowchart illustrated in FIG. 12.

Figure 13:
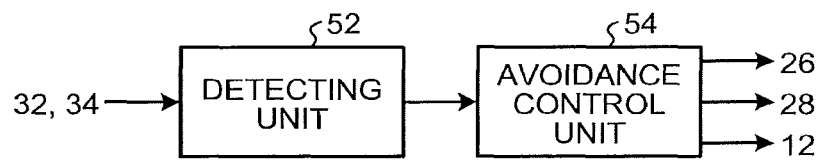
FIG. 13 is a diagram illustrating a configuration of a managing unit.

FIG. 13 is a diagram illustrating a configuration of the managing unit 40. The managing unit 40 includes a detecting unit 52 and an avoidance control unit 54.

The detecting unit 52 detects the writing having a high degree of spatial and temporal locality in the nonvolatile memory unit 16. That is, the managing unit 40 detects the writing that has a high degree of locality and that is writing operations performed to the extent equal to or greater than a reference value, with respect to the same area of the nonvolatile memory unit 16. Then, the detecting unit 52 identifies the area under attack in which the writing having a high degree of locality was performed.

For example, the detecting unit 52 detects consecutive writing in the same area a number of times equal to or greater than the reference count; and identifies, as the area under attack, the area in which consecutive writing has occurred a number of times equal to or greater than the reference count. For example, the detecting unit 52 detects, as the writing having a high degree of locality, consecutive writing in the same page in the nonvolatile memory unit 16 performed a number of times equal to or greater than the reference count. In that case, the detecting unit 52 detects, as the page under attack, the page in which the writing having a high degree of locality is detected.

Moreover, for example, the detecting unit 52 detects, as the writing having a high degree of locality, consecutive writing performed in the same cache line (the second area) in the nonvolatile memory unit 16 a number of times equal to or greater than the reference count. In that case, the detecting unit 52 identifies, as the cache line under attack, the cache line in which the writing having a high degree of locality is detected.

Furthermore, for example, the detecting unit 52 detects writing performed in the same area a number of times equal to or greater than the reference count within a predetermined period of time; and identifies, as the area under attack, the area in which writing is detected a number of times equal to or greater than the reference count within the predetermined period of time. Herein, the writing performed a number of times equal to or greater than the reference count within the predetermined period of time implies the following, for example: within a period of time in which the writing is performed for a total of 10 times, 80% or more of the writing (i.e., the writing for eight times or more) is performed in the same area.

For example, the detecting unit 52 detects, as the writing having a high degree of locality, the writing performed in the same page in the nonvolatile memory unit 16 a number of times equal to or greater than the reference count within a predetermined period of time. In that case, the detecting unit 52 identifies, as the page under attack, the page in which the writing having a high degree of locality is detected.

Moreover, for example, the detecting unit 52 detects, as the writing having a high degree of locality, the writing performed in the same cache line (second area) in the nonvolatile memory unit 16 a number of times equal to or greater than the reference count within a predetermined period of time. In that case, the detecting unit 52 identifies, as the cache line under attack, the cache line in which the writing having a high degree of locality is detected.

Furthermore, the detecting unit 52 refers to a table indicating the writing count for each area in the nonvolatile memory unit 16, and detects the writing having a high degree of locality in the nonvolatile memory unit 16. For example, the detecting unit 52 detects updating of the counter values stored in the counter table, and detects the writing having a high degree of locality in the same page.

When the writing having a high degree of locality is detected, the detecting unit 52 notifies the avoidance control unit 54 about the fact that the writing having a high degree of locality was performed and about the identified area under attack. For example, the detecting unit 52 notifies the avoidance control unit 54 about the page number of the area under attack, or about the page number of the cache line under attack as well as the cache line number.

As a result of performing such processes, the detecting unit 52 becomes able to detect the possibility that a malicious computer program has been executed by the processing circuit 12. Then, the detecting unit 52 can notify the avoidance control unit 54 about the area under attack that is likely to have been attacked by a malicious computer program.

When the detecting unit 52 detects the writing having a high degree of locality, the avoidance control unit 54 performs an avoidance process for avoiding a situation in which the nonvolatile memory unit 16 stops functioning normally.

For example, when the writing having a high degree of locality is detected; the avoidance control unit 54 moves the target data, which is stored in the area under attack in the nonvolatile memory unit 16, to the first memory unit 14. For example, when the writing having a high degree of locality is detected, the avoidance control unit 54 switches the access method, which is meant for accessing either the area under attack or the page including the cache line under attack, from the second access process to the first access process. As a result, when there is a possibility that a malicious computer program has been executed by the processing circuit 12, the avoidance control unit 54 can forcibly divert the accesses meant for the nonvolatile memory unit 16 to the first memory unit 14, and can avoid a situation in which the nonvolatile memory unit 16 stops functioning normally.

Moreover, for example, when the writing having a high degree of locality is detected, the avoidance control unit 54 stops the access processing unit 28 from accessing the area under attack. For example, the avoidance control unit 54 can stop the access processing unit 28 from writing data in the area under attack. As a result, when there is a possibility that a malicious computer program has been executed by the processing circuit 12, the avoidance control unit 54 can immediately stop unauthorized writing in the nonvolatile memory unit 16.

Furthermore, for example, when the writing having a high degree of locality is detected, the avoidance control unit 54 notifies the processing circuit 12 about the writing having a high degree of locality. As a result, the avoidance control unit 54 can enable the processing circuit 12 to determine whether or not there is any unauthorized access.

Moreover, after notifying the processing circuit 12 about the writing having a high degree of locality, if a notification about an unauthorized access is received from the processing circuit 12, the avoidance control unit 54 can stop the access processing unit 28 from accessing the nonvolatile memory unit 16. As a result, in case a malicious computer program was being executed by the processing circuit 12, the avoidance control unit 54 can stop the accesses with respect to the nonvolatile memory unit 16.

In this way, when there is a possibility that a malicious computer program has been executed by the processing circuit 12, the avoidance control unit 54 can protect the area under attack that is likely to have been attacked by the malicious computer program.

Figure 14:
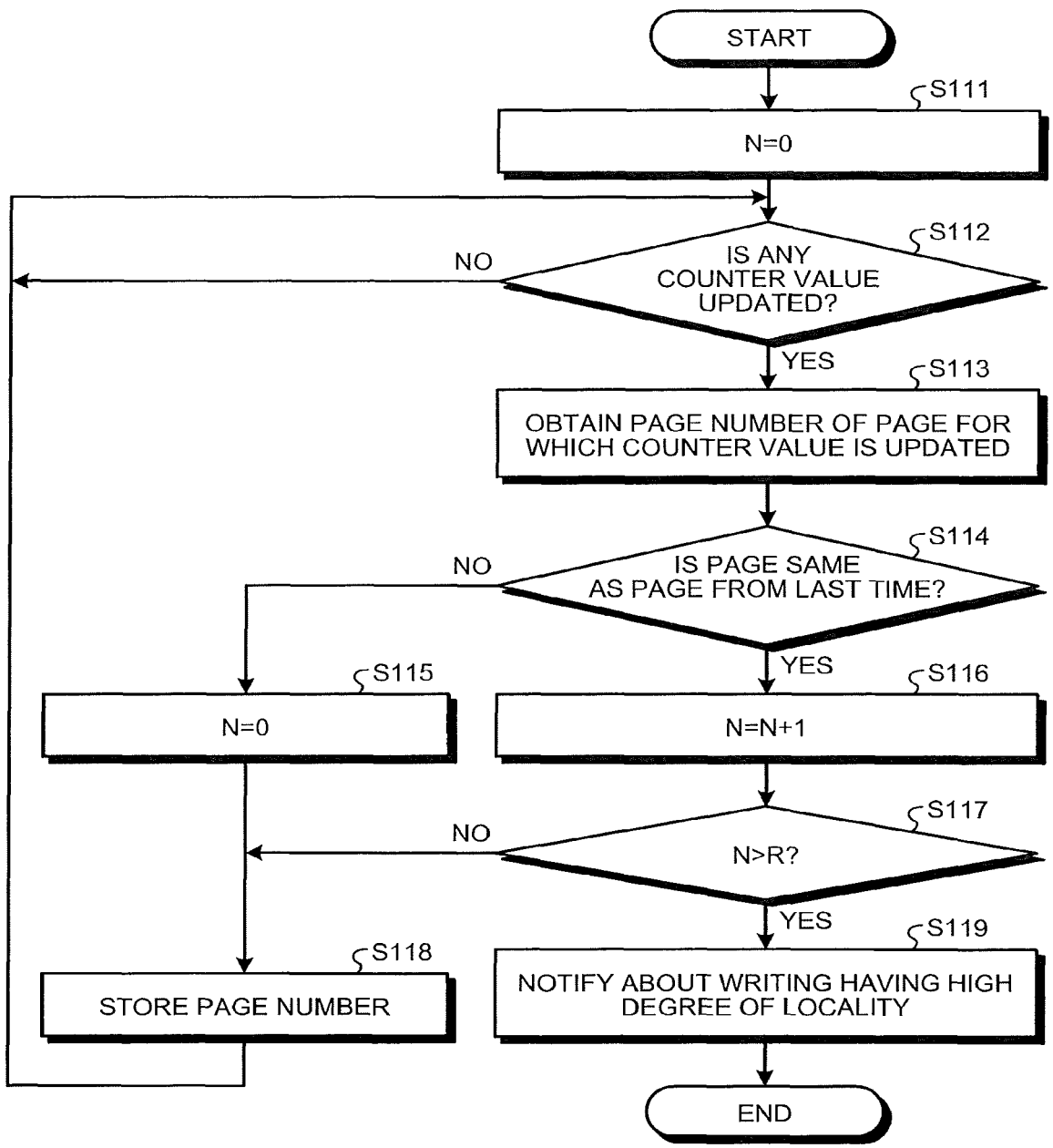
FIG. 14 is a flowchart for explaining a first process performed by a detecting unit.

FIG. 14 is a flowchart for explaining a first process performed by the detecting unit 52. Thus, for example, the detecting unit 52 performs processes according to the flowchart illustrated in FIG. 14.

Firstly, at Sill, the detecting unit 52 resets N to "0". Herein, N represents a variable indicating the consecutive writing count with respect to the same page. Then, at S112, the detecting unit 52 determines whether or not any counter value in the counter table has been updated. If no counter value has been updated (No at S112), then the system control waits at S111. When a counter value is updated (Yes at S112), the system control proceeds to S113.

At S113, the detecting unit 52 obtains the page number of the page for which the counter value has been updated. Then, at S114, the detecting unit 52 determines whether or not the page for which the counter value was updated last time is same as the page for which the counter value is updated this time.

If the pages are not same (No at S114), the system control proceeds to S115. At S115, the detecting unit 52 resets the variable N to "0". When the process at S115 is finished, the system control proceeds to S118.

On the other hand, if the pages are same (Yes at S114), the system control proceeds to S116. At S116, the detecting unit 52 increments the variable N by one. Then, at S117, the detecting unit 52 determines whether or not the variable N is greater than a predetermined reference count (R). If the variable N is not greater than the reference count R (No at S117), then the system control proceeds to S118. However, if the variable N is greater than the reference count R (Yes at S117), then the system control proceeds to S119.

At S118, the detecting unit 52 stores the current page number and the system control returns to S112. Then, the detecting unit 52 again performs the processes from S112 to S119.

At S119, the detecting unit 52 notifies the avoidance control unit 54 about the writing having a high degree of locality. Along with that, the detecting unit 52 notifies the avoidance control unit 54 about the page under attack as the page in which consecutive writing occurred a number of times equal to or greater than the reference count. When the process at S119 is finished, the detecting unit 52 ends the flow of processes.

As a result of performing the processes described above, the detecting unit 52 can detect that consecutive writing has occurred in the same page in the nonvolatile memory unit 16 a number of times equal to or greater than the reference count. Then, the detecting unit 52 can notify the avoidance control unit 54 about the fact that consecutive writing occurred a number of times equal to or greater than the reference count, and about the page under attack.

Figure 15:
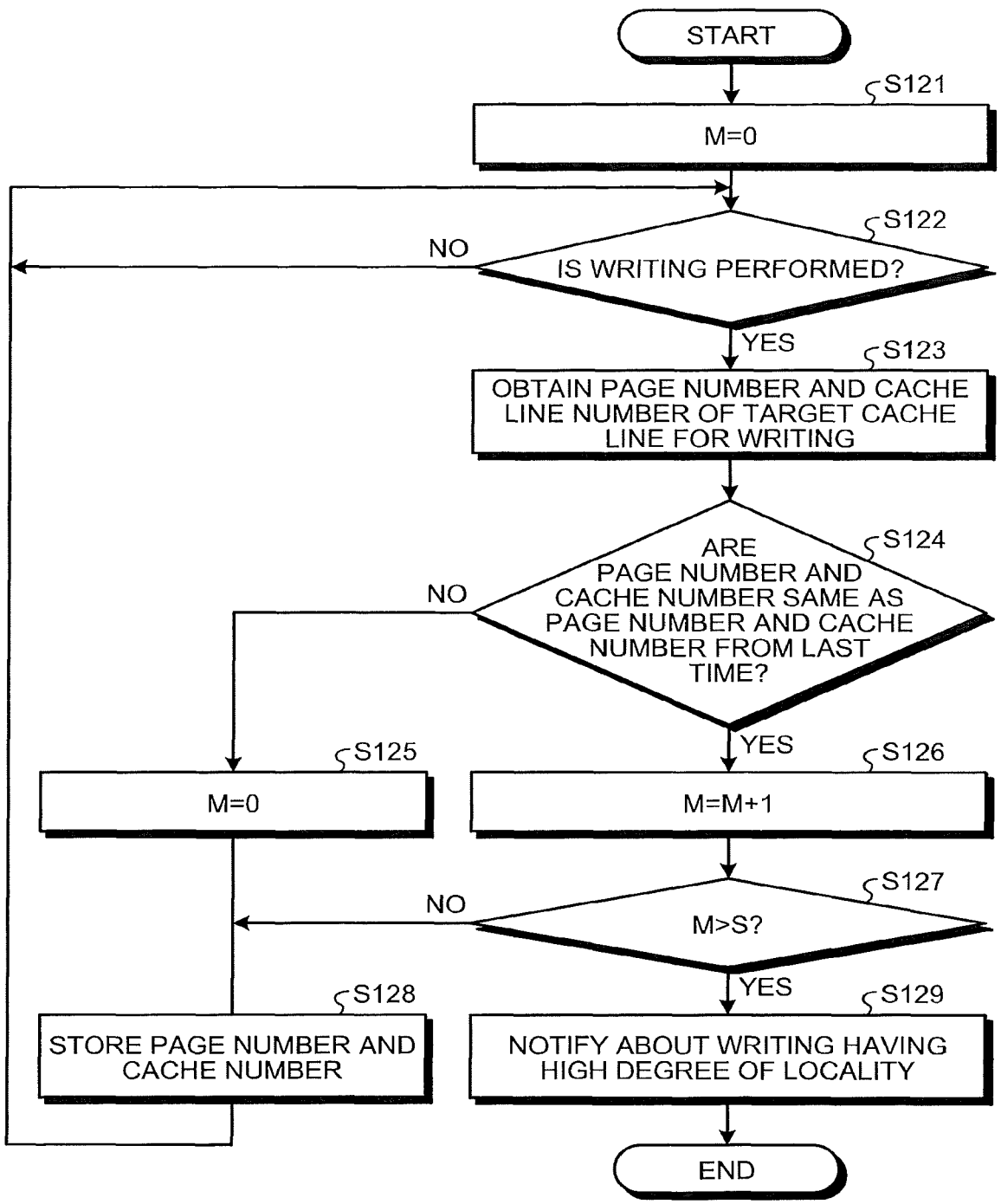
FIG. 15 is a flowchart for explaining a second process performed by the detecting unit.

FIG. 15 is a flowchart for explaining a second process performed by the detecting unit 52. Thus, for example, the detecting unit 52 can perform processes also according to the flowchart illustrated in FIG. 15.

Firstly, at S121, the detecting unit 52 resets M to "0". Herein, M represents a variable indicating the consecutive writing count with respect to the same cache line. Then, at S122, the detecting unit 52 determines whether or not writing is performed in the nonvolatile memory unit 16. If writing is not performed (No at S122), the system control waits at S122. When writing is performed (Yes at S122), the system control proceeds to S123.

At S123, the detecting unit 52 obtains the page number and the cache line number of the target cache line for writing. Then, at S124, the detecting unit 52 determines whether or not the page number and the cache line number of the cache line in which writing was performed last time are same as the page number and the cache line number of the cache line in which writing is performed this time.

If the page numbers and the cache line numbers are not same (No at S124), the system control proceeds to S125. At S125, the detecting unit 52 resets the variable M to "0". When the process at S125 is finished, the system control proceeds to S128.

On the other hand, if the page numbers and the cache line numbers are same (Yes at S125), the system control proceeds to S126. At S126, the detecting unit 52 increments the variable M by one. Subsequently, at S127, the detecting unit 52 determines whether or not the variable M is greater than a predetermined reference count (S). If the variable M is not greater than the reference count S (No at S127), then the system control proceeds to S128. However, if the variable M is greater than the reference count S (Yes at S127), then the detecting unit 52 proceeds to S129.

At S128, the detecting unit 52 stores the page number and the cache line number of the cache line in which writing is performed this time, and the system control returns to S122. Then, the detecting unit 52 again performs the processes from S122 to S129.

At S129, the detecting unit 52 notifies the avoidance control unit 54 about the writing having a high degree of locality. Along with that, the detecting unit 52 notifies the avoidance control unit 54 about, as the cache line under attack, the cache line in which consecutive writing occurred a number of times equal to or greater than the reference count. When the process at S129 is finished, the detecting unit 52 ends the flow of processes.

As a result of performing the processes described above, the detecting unit 52 can detect consecutive writing in the same cache line in the nonvolatile memory unit 16 performed a number of times equal to or greater than the reference count. Then, the detecting unit 52 can notify the avoidance control unit 54 about the fact that consecutive writing occurred a number of times equal to or greater than the reference count, and about the cache line under attack.

FIG. 16 is a diagram illustrating a modification example of the management table. For example, the management table can have the configuration as illustrated in FIG. 16. In the management table illustrated in FIG. 16, the management information stored in each entry contains the writing count within a predetermined period of time. The writing count within a predetermined period of time represents a value indicating the number of times which the counter value for the concerned page is updated within the predetermined period of time. Every time the counter value for some page is updated (every time a counter value is incremented by one), the updating unit 36 increments by one the writing count of the concerned page as specified in the management information of the concerned page in the management table.

Figures 17, 18:
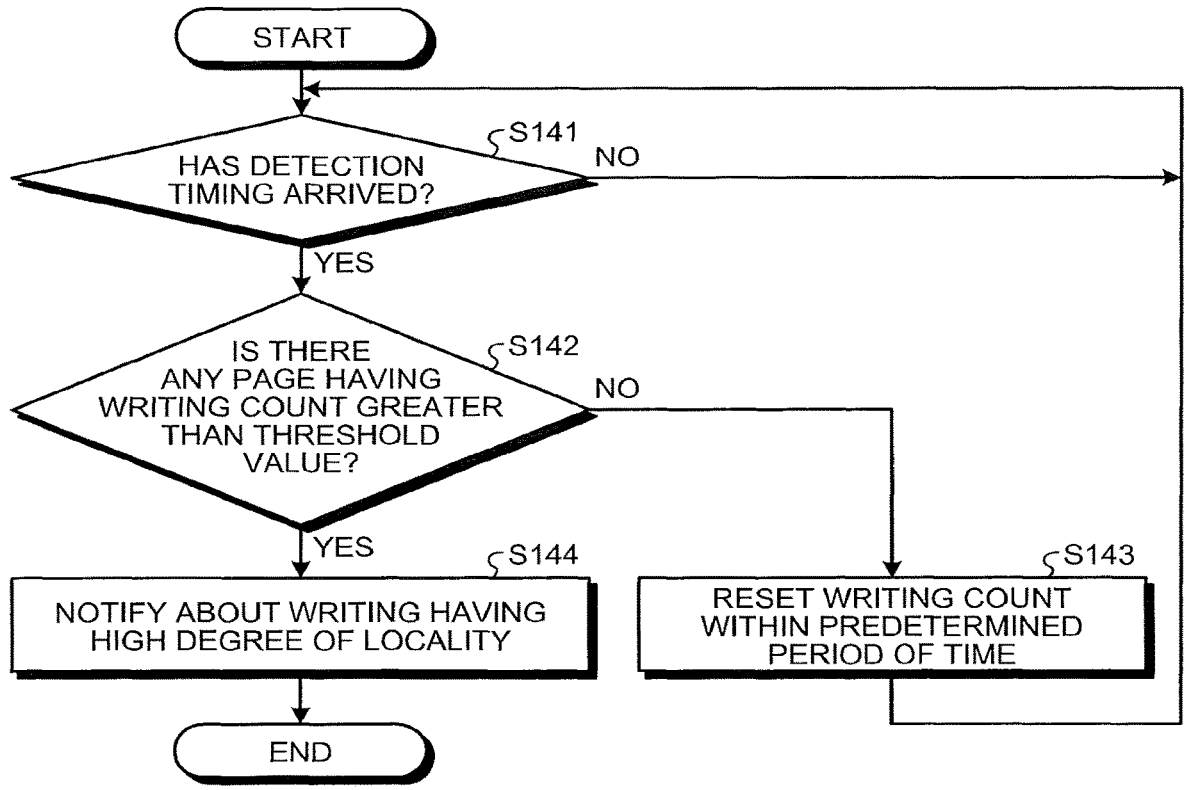
FIG. 17 is a flowchart for explaining a third process performed by the detecting unit.
FIG. 18 is a diagram illustrating a modification example of the counter table.

FIG. 17 is a flowchart for explaining a third process performed by the detecting unit 52. For example, in the case of using the management table illustrated in FIG. 16, the processes can be performed according to the flowchart illustrated in FIG. 17.

At S141, the detecting unit 52 determines whether or not a predetermined detection timing has arrived. The detection timing can be a timing arriving at regular intervals. Alternatively, the detection timing can be the timing after every predetermined number of instances of writing performed by the access processing unit 28. Still alternatively, the detection timing can be the timing after every predetermined number of instances of updating of a counter value.

If the detection timing has not arrived (No at S141), the system control waits at S141. When the detection timing arrives (Yes at S141), the system control proceeds to S142.

At S142, the detecting unit 52 refers to the item of writing count in the management table and determines whether or not there is any page having the writing count greater than a predetermined threshold value. If there is no page having the writing count greater than the threshold value (No at S142), then the system control proceeds to S143. At S143, the detecting unit 52 resets the writing count within the predetermined period of time to "0" in all entries in the management table. After the process at S143 is finished, the system control returns to S141. Then, the detecting unit 52 again performs the processes from S141 to S144.

Meanwhile, if there is a page having the writing count greater than the threshold value (Yes at S142), the system control proceeds to S144. At S144, the detecting unit 52 notifies the avoidance control unit 54 about the writing having a high degree of locality. Along with that, the detecting unit 52 notifies the avoidance control unit 54 about the page having the writing count equal to or greater than the threshold value as the page under attack. When the process at S144 is finished, the detecting unit 52 ends the flow of processes.

As a result of performing the processes described above, the detecting unit 52 can detect writing in the same page performed a number of times equal to or greater than a threshold value within a predetermined period of time. Then, the detecting unit 52 can notify the avoidance control unit 54 about the fact that writing occurred in the same page a number of times equal to or greater than the threshold value within the predetermined period of time, and about the page under attack.

Meanwhile, the detection timing at S141 illustrated in FIG. 17 can be the timing of implementing wear levelling. In that case, at each timing of implementing wear levelling, the detecting unit 52 can detect the occurrence of writing performed a number of times equal to or greater than the threshold value. For example, every time the counter value is updated a predetermined number of times, the wear levelling execution unit 38 implements wear levelling. Thus, every time wear levelling is implemented, the detecting unit 52 can detect the occurrence of writing in the same area performed a number of times equal to or greater than the reference count.

FIG. 18 is a diagram illustrating a modification example of the counter table. Thus, the counter table can also have a configuration as illustrated in FIG. 18. In the counter table illustrated in FIG. 18, each entry includes the writing count for the corresponding page within a predetermined period of time. Every time the counter value of any page is updated (every time a counter value is incremented by one); the updating unit 36 increments by one the writing count in the corresponding entry in the counter table.

If the counter table illustrated in FIG. 18 is stored in the counter storing unit 32, the management table need not include the writing count within the predetermined period of time. Moreover, instead of using the management table, the detecting unit 52 uses the counter table illustrated in FIG. 18 and performs the processes from S141 to S144 illustrated in FIG. 17.

Figure 19:
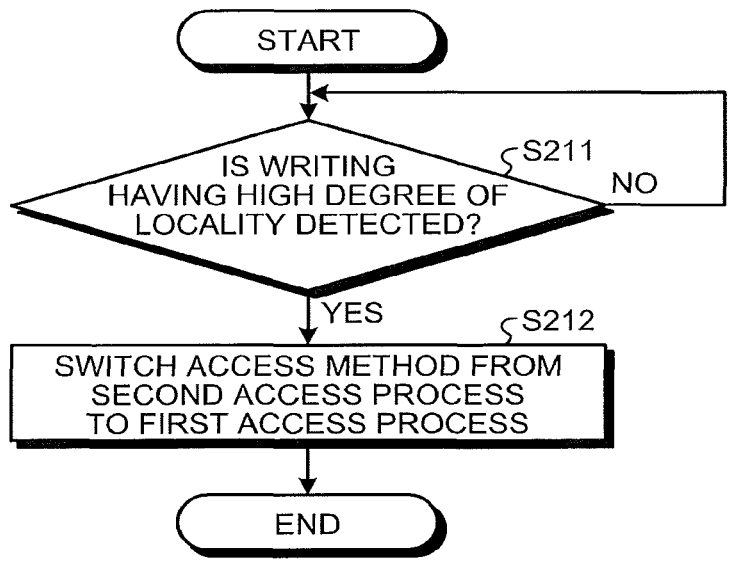
FIG. 19 is a flowchart for explaining a first process performed by an avoidance control unit.

FIG. 19 is a flowchart for explaining a first process performed by the avoidance control unit 54. Thus, for example, the avoidance control unit 54 performs processes according to the flowchart illustrated in FIG. 19.

Firstly, at S211, the avoidance control unit 54 determines whether or not the detecting unit 52 has detected the writing having a high degree of locality. If there is no writing having a high degree of locality (No at S211), then the system control waits at S211. When there is writing having a high degree of locality (Yes at S211), the system control proceeds to S212.

At S212, regarding the page under attack or the page including the cache line under attack as identified by the detecting unit 52, the avoidance control unit 54 switches the access method from the second access process to the first access process. As a result, when the writing having a high degree of locality is detected, the avoidance control unit 54 can move the target data, which is stored in the area under attack in the nonvolatile memory unit 16, to the first memory unit 14. When the process at S212 is finished, the avoidance control unit 54 ends the flow of processes.

As a result of performing the processes described above, when there is a possibility that a malicious computer program has been executed by the processing circuit 12, the avoidance control unit 54 can forcibly divert the accesses meant for the nonvolatile memory unit 16 to the first memory unit 14, and thus can avoid a situation in which the nonvolatile memory unit 16 stops functioning normally.

Figure 20:
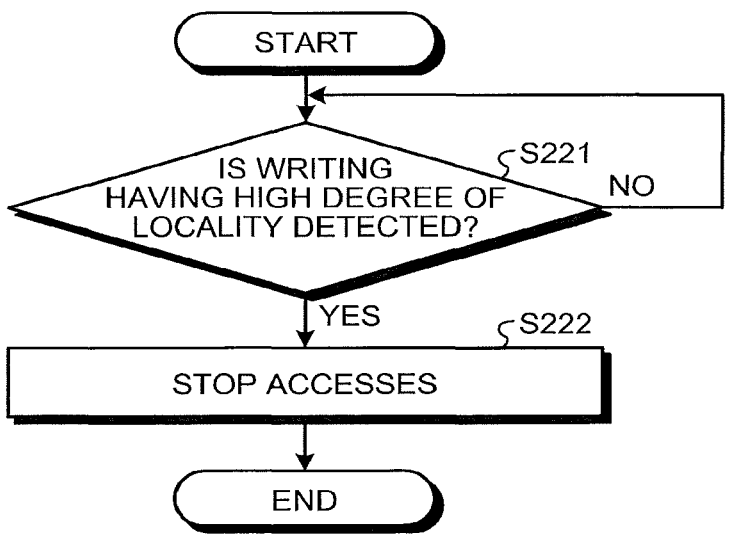
FIG. 20 is a flowchart for explaining a second process performed by the avoidance control unit.

FIG. 20 is a flowchart for explaining a second process performed by the avoidance control unit 54. Thus, for example, the avoidance control unit 54 can perform processes also according to the flowchart illustrated in FIG. 20.

Firstly, at S221, the avoidance control unit 54 determines whether or not the detecting unit 52 has detected the writing having a high degree of locality. If there is no writing having a high degree of locality (No at S221), the system control waits at S221. When there is writing having a high degree of locality (Yes at S221), the system control proceeds to S222.

At S222, the avoidance control unit 54 stops the accesses with respect to the page under attack or the cache line under attack as identified by the detecting unit 52. For example, the avoidance control unit 54 can stop the access processing unit 28 from writing data in the page under attack or the cache line under attack. Alternatively, the avoidance control unit 54 can stop the accesses with respect to the entire nonvolatile memory unit 16. When the process at S222 is finished, the avoidance control unit 54 ends the flow of processes.

As a result of the processes described above, when there is a possibility that a malicious computer program has been executed by the processing circuit 12, the avoidance control unit 54 can immediately stop unauthorized writing in the nonvolatile memory unit 16. As a result, the avoidance control unit 54 can avoid a situation in which the nonvolatile memory unit 16 stops functioning normally.

Figure 21:
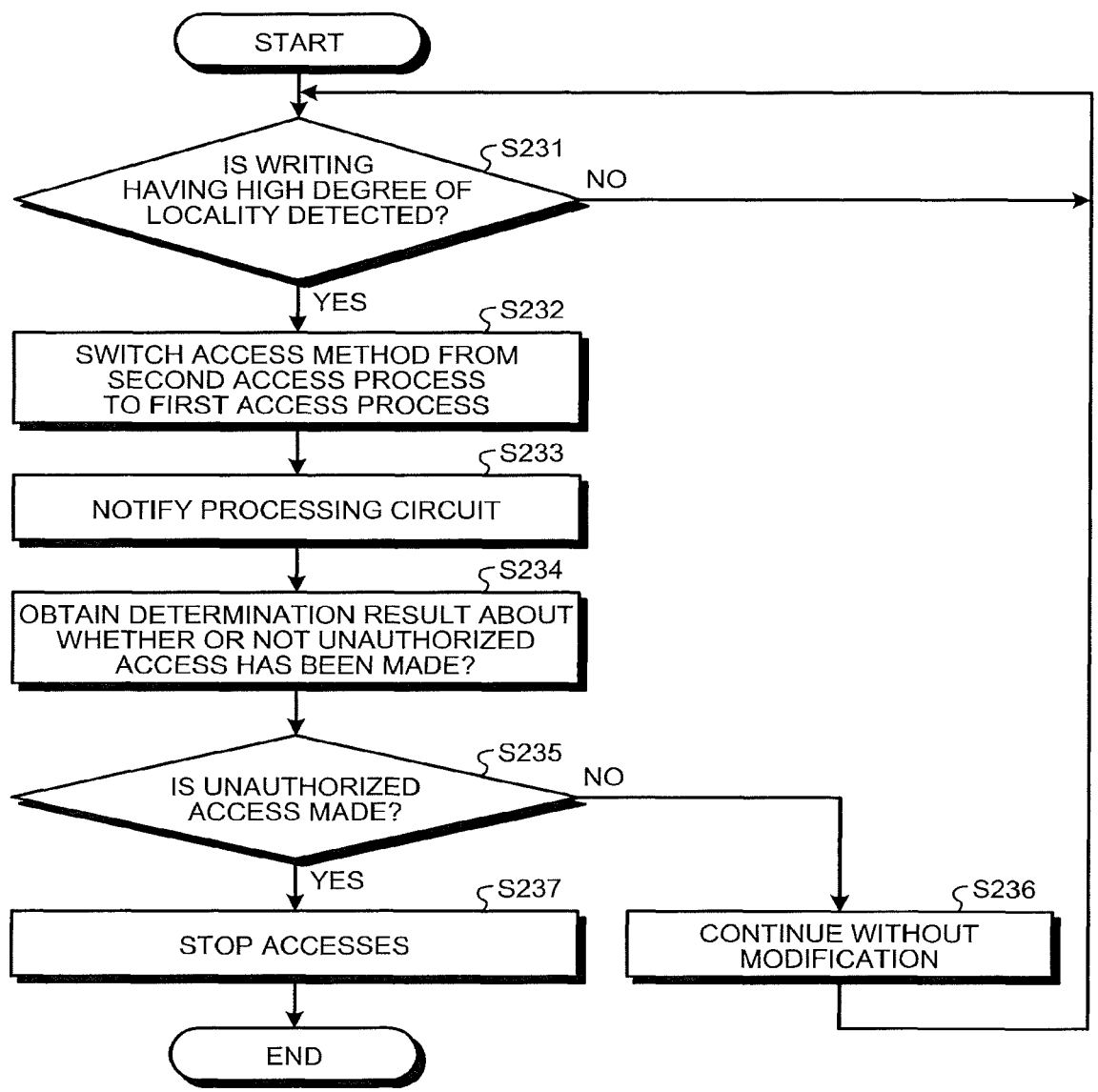
FIG. 21 is a flowchart for explaining a third process performed by the avoidance control unit.

FIG. 21 is a flowchart for explaining a third process performed by the avoidance control unit 54. Thus, for example, the avoidance control unit 54 can perform processes also according to the flowchart illustrated in FIG. 21.

Firstly, at S231, the avoidance control unit 54 determines whether or not the detecting unit 52 has detected the writing having a high degree of locality. If there is no writing having a high degree of locality (No at S231), the system control waits at S231. When there is writing having a high degree of locality (Yes at S231), the system control proceeds to S232.

At S232, regarding the page under attack or the page including the cache line under attack as identified by the detecting unit 52, the avoidance control unit 54 switches the access method from the second access process to the first access process. As a result, when the writing having a high degree of locality is detected, the avoidance control unit 54 can move the target data, which is stored in the area under attack in the nonvolatile memory unit 16, to the first memory unit 14.

Subsequently, at S233, the avoidance control unit 54 notifies the processing circuit 12 about the writing having a high degree of locality. As a result, the avoidance control unit 54 can enable the processing circuit 12 to determine whether or not there is any unauthorized access. Upon receiving the notification and based on the information obtained from the avoidance control unit 54, the processing circuit 12 determines whether or not there is any unauthorized access with respect to the area under attack. Then, the processing circuit 12 sends the determination result to the avoidance control unit 54.

Subsequently, at S234, the avoidance control unit 54 obtains, from the processing circuit 12, the determination result about whether or not there is any unauthorized access. Then, at S235, based on the obtained determination result, the avoidance control unit 54 determines whether or not there is any unauthorized access. If there is no unauthorized access (No at S235), then the system control proceeds to S236. However, if there is an unauthorized access (Yes at S235), then the system control proceeds to S237.

At S236, the avoidance control unit 54 ensures that the processes are continued without modification. Then, the system control returns to S231 and the avoidance control unit 54 again performs the processes from S231 to S237. That is, the avoidance control unit 54 ensures that the processes are continued, with the first access process being set as the access method for the page under attack or the page including the cache line under attack as identified by the detecting unit 52. As a result, the avoidance control unit 54 can move, to the first memory unit 14, the data being accessed not in an unauthorized manner but in a localized manner; and can hold down an increase in the writing count with respect to a particular area in the nonvolatile memory unit 16.

At S237, the avoidance control unit 54 stops the accesses with respect to the page under attack or the cache line under attack as identified by the detecting unit 52. For example, the avoidance control unit 54 can stop the access processing unit 28 from writing data in the page under attack or the cache line under attack. Alternatively, the avoidance control unit 54 can stop the accesses with respect to the entire nonvolatile memory unit 16. As a result, in case there is an unauthorized access, the avoidance control unit 54 can stop unauthorized writing in the nonvolatile memory unit 16. When the process at S237 is finished, the avoidance control unit 54 ends the flow of processes.

As a result of performing the processes described above, when there is a possibility of an unauthorized access by virtue of the writing having a high degree of locality; in the first stage, the avoidance control unit 54 forcibly diverts the accesses meant for the nonvolatile memory unit 16 to the first memory unit 14, and avoids a situation in which the nonvolatile memory unit 16 stops functioning normally. Subsequently, when it is confirmed that there was an unauthorized access; in the second stage, the avoidance control unit 54 stops the accesses with respect to the nonvolatile memory unit 16. As a result, the avoidance control unit 54 not only can protect the nonvolatile memory unit 16, but can also avoid a situation in which an access is disallowed in spite of it not being an unauthorized access.

As described above, in the management device 18 according to the first embodiment, the writing having a high degree of locality in the nonvolatile memory unit 16 is detected by referring to the counter table; and the area under attack is identified in which the writing having a high degree of locality is performed. Moreover, in the management device 18 according to the first embodiment, when the writing having a high degree of locality is detected, the avoidance process is performed. As a result of using the management device 18, unauthorized accesses with respect to the nonvolatile memory unit 16 can be detected. Moreover, as a result of using the management device 18, it becomes possible to avoid a situation in which the nonvolatile memory unit 16 stops functioning normally.

Second Embodiment

Given below is the explanation of the information processing device 10 according to a second embodiment.

Figure 22:
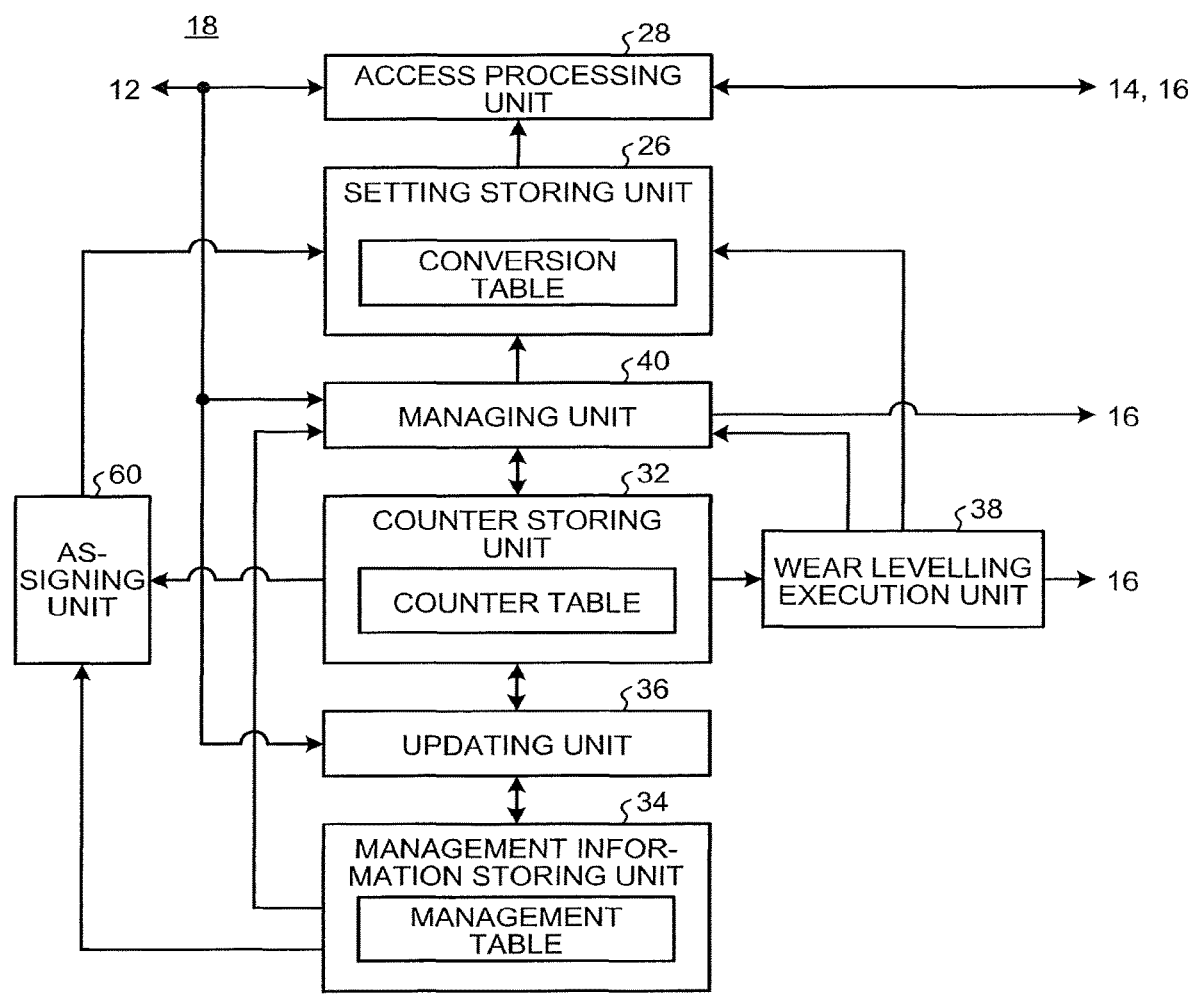
FIG. 22 is a diagram illustrating a configuration of a management device according to a second embodiment.

FIG. 22 is a diagram illustrating a configuration of the management device 18 according to the second embodiment. The management device 18 according to the second embodiment further includes an assigning unit 60.

The assigning unit 60 assigns an access method for each of a plurality of pages included in the nonvolatile memory unit 16. More particularly, the assigning unit 60 assigns either the first access process or the second access process for each of a plurality of pages.

For example, during a period of time in which it is guaranteed that the processing circuit 12 executes authorized computer programs, the assigning unit 60 analyzes the volume of writing performed in each of a plurality of pages. Then, based on the analysis result, the assigning unit 60 assigns either the first access process or the second access process for each page, and registers the assignment details in the conversion table stored in the setting storing unit 26.

For example, the assigning unit 60 assigns the first access process for the pages in such entries for which the number of bits indicating "1" in the mapping information of the management table is equal to or greater than a first threshold value. Moreover, the assigning unit 60 can assign the second access process for the pages in such entries for which the number of bits indicating "1" in the mapping information of the management table is smaller than the first threshold value.

For example, the assigning unit 60 assigns the first access process for such pages in which, as a result of assigning the first access process, the volume of writing in the nonvolatile memory unit 16 (for example, the writing count within a predetermined period of time) decreases by a greater extent. Moreover, the assigning unit 60 can limit the number of pages to be assigned with the first access process in such a way that the memory usage of the first memory unit 14 does not exceed the setting range.

Furthermore, for example, while the processing circuit 12 is executing a computer program, if the volume of writing in the nonvolatile memory unit 16 (for example, the writing count within a predetermined period of time) is greater than the first threshold value, then the assigning unit 60 can select any one page set to the second access process as the target page for swapping, and can switch the access method for the target page for swapping from the second access process to the first access process. Moreover, for example, while the processing circuit 12 is executing a computer program, if the volume of writing in the nonvolatile memory unit 16 (for example, the writing count within a predetermined period of time) is smaller than the first threshold value, then the assigning unit 60 can select any one page set to the first access process as the target page for temporary storage, and can switch the access method for the target page for temporary storage from the first access process to the second access process. As a result of performing such processes, while maintaining the memory usage of the first memory unit 14 within the setting range, the assigning unit 60 can hold down the volume of writing in the nonvolatile memory unit 16.

Figure 23:
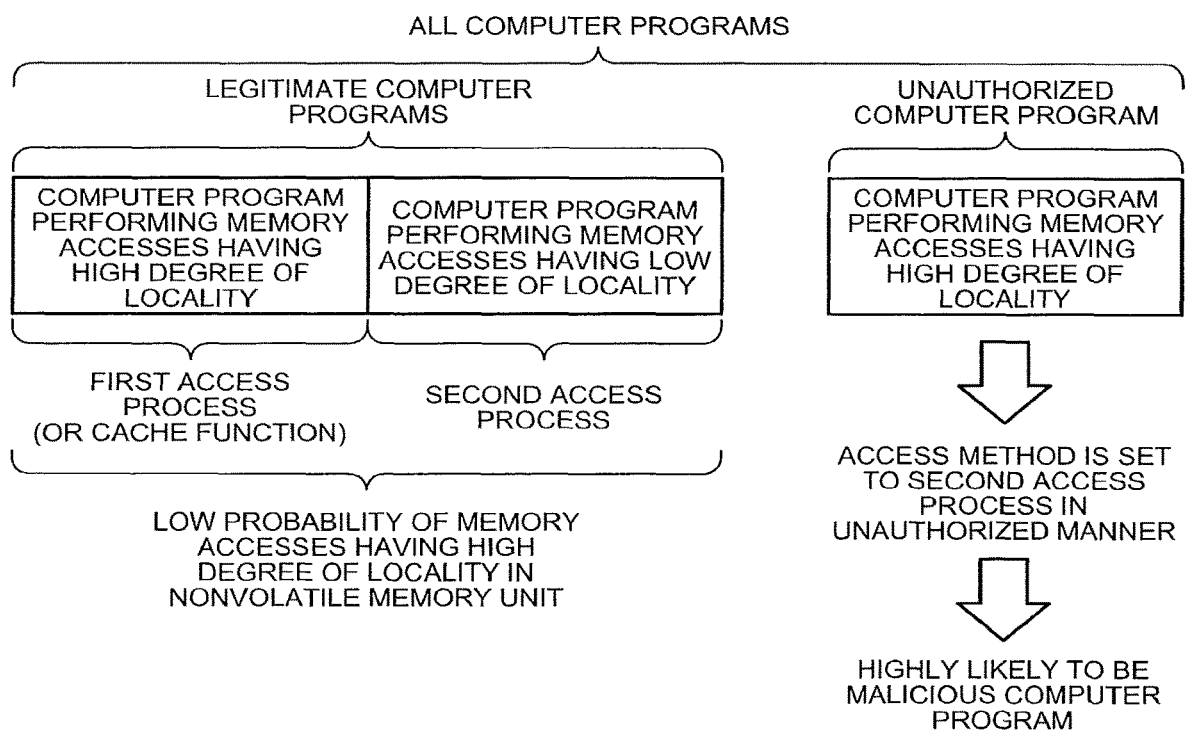
FIG. 23 is a diagram for explaining the case of detecting the writing having a high degree of locality.

FIG. 23 is a diagram for explaining computer programs that are executed in the case of detecting the writing having a high degree of locality.

In a malicious attempt to attack the nonvolatile memory unit 16 by intensively accessing a particular area in the nonvolatile memory unit 16, an unauthorized person makes the processing circuit 12 execute a computer program that performs memory accesses having a high spatial and temporal locality. However, computer programs that perform memory accesses having a high spatial and temporal locality also include computer programs without any malicious intent. Hence, analyzing the memory accesses and determining whether or not a computer program is malicious in nature is generally a difficult task. However, the management device 18 according to the second embodiment is capable of distinguishing a malicious computer program that performs memory accesses having a high locality from a non-malicious computer program that performs memory accesses having a high locality. The reason for that is as follows.

Based on the result of analyzing the memory accesses during the execution of a legitimate computer program, the assigning unit 60 assigns the access method. In this case, the assignment of the access method for a plurality of pages is done in the following manner. A normal computer program performing memory accesses having a high degree of locality either accesses the memory according to the first access process or using the cache function in the processing circuit 12. Moreover, a normal computer program performing memory accesses having a low degree of locality (having dispersed locality) accesses the memory according to the second access process. Hence, when a normal computer program is being executed, there is a low probability of memory accesses having a high degree of locality.

In contrast, a malicious computer program intending to attack the nonvolatile memory unit 16 slips through the assignment of the access method by the assigning unit 60 and performs memory accesses having a high degree of locality according to the second access process. That is, a malicious computer program is written to have a function by which the first access process is not assigned thereto by the assigning unit 60.

For that reason, the second access process is implemented in the following two cases: (A) memory accesses by a malicious computer program, and (B) memory accesses by a computer program that performs memory accesses having a low degree of locality. Thus, by detecting memory accesses having a high degree of locality with respect to the nonvolatile memory unit 16, the detecting unit 52 can detect, with a high probability, malicious computer programs performing memory accesses having a high degree of locality.

That is, the management device 18 implements two types of access methods, namely, the first access process and the second access process. Then, the management device 18 assigns the access method in advance in such a way that the data referred to by a non-malicious computer program performing memory accesses having a high degree of spatial and temporal locality either has a cache hit in the processing circuit 12 or is accessed according to the first access process. As a result, the management device 18 can narrow down the memory accesses having a high degree of locality with respect to the nonvolatile memory unit 16 to the memory accesses performed by malicious computer programs. In this way, the management device 18 can easily detect malicious computer programs.

Modification Examples

Given below is the explanation of modification examples according to the embodiments.

Figures 24, 25:
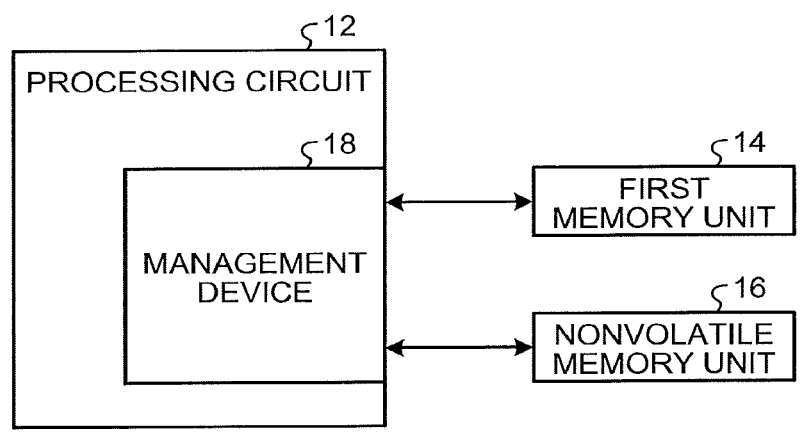
FIG. 24 is a diagram illustrating a modification example of identification information.
FIG. 25 is a diagram illustrating a first modification example of the configuration of the information processing device.

FIG. 24 is a diagram illustrating a modification example of the identification information. The management device 18 identifies the management information, which is stored in the management table, using page numbers. Alternatively, the management device 18 can identify the management information, which is stored in the management table, by associating it with addresses managed by a translation lookaside buffer (TLB).

The processing circuit 12 includes a virtual memory mechanism called a TLB, which is used to store correspondence relationship information indicating the correspondence between logical addresses in a page and physical addresses in order to enable address conversion from virtual addresses to physical addresses. However, since there are only a limited number of entries held in the TLB, the correspondence relationship information is swapped as may be necessary. For example, in the TLB, the correspondence relationship information about the pages that were recently accessed at a high frequency is stored on a priority basis.

Thus, the management device 18 can store, in the management table, such pages for which the correspondence relationship information is stored in the TLB. For example, the management device 18 stores a management table having the same number of entries as the number of entries in the TLB. Then, at a timing at which the correspondence relationship information is pushed out from an entry of the TLB, the updating unit 36 deletes the corresponding management information form the management table. In that case, the updating unit 36 performs identical processes to the case in which management information is overwritten with some other management information. Meanwhile, since the management table has the same number of entries as the number of entries in the TLB, it need not include the entries for storing the identification information.

As a result of storing the management information in the management table in the abovementioned manner, the management device 18 can efficiently manage the writing count for each page, which is required in wear levelling, in a synchronized manner with the processing circuit 12.

FIG. 25 is a diagram illustrating a first modification example of the configuration of the information processing device 10. For example, the processing circuit 12 according to the first modification example has the management device 18 installed therein. Moreover, the first memory unit 14 and the nonvolatile memory unit 16 are installed on the outside of the processing circuit 12.

Figure 26:
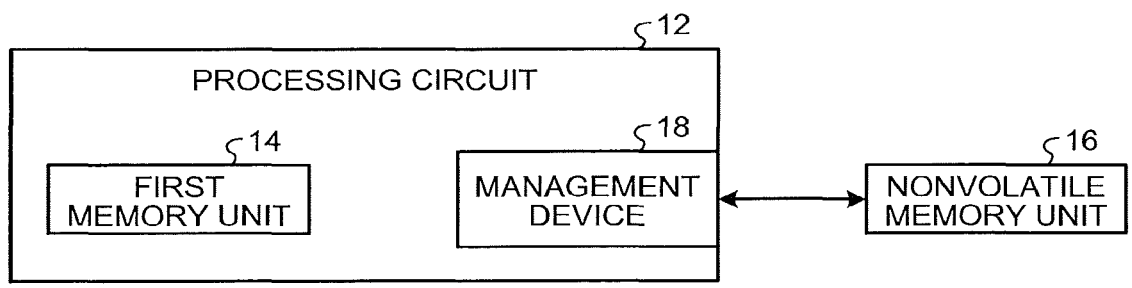
FIG. 26 is a diagram illustrating a second modification example of the configuration of the information processing device.

FIG. 26 is a diagram illustrating a second modification example of the configuration of the information processing device 10. For example, the processing circuit 12 according to the second modification example has the management device 18 installed therein. Moreover, the processing circuit 12 also has the first memory unit 14 installed therein.

Figure 27:
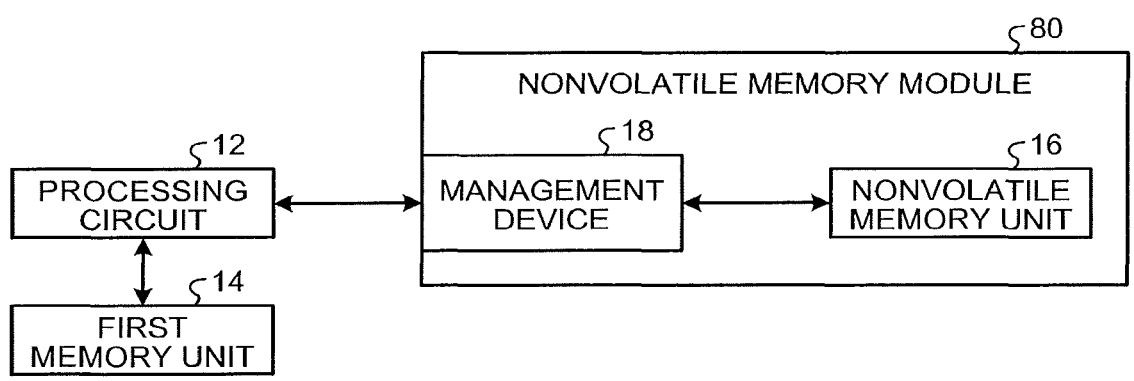
FIG. 27 is a diagram illustrating a third modification example of the configuration of the information processing device.

FIG. 27 is a diagram illustrating a third modification example of the configuration of the information processing device 10. The processing circuit 12 can include a nonvolatile memory module 80. In that case, the nonvolatile memory module 80 includes the nonvolatile memory unit 16 and the management device 18.

Figure 28:
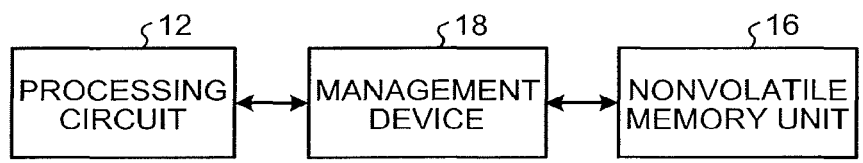
FIG. 28 is a diagram illustrating a fourth modification example of the configuration of the information processing device.

FIG. 28 is a diagram illustrating a fourth modification example of the configuration of the information processing device 10. For example, the information processing device 10 includes the processing circuit 12, the nonvolatile memory unit 16, and the management device 18. That is, the information processing device 10 may not include the first memory unit 14. In that case, although the access method cannot be switched from the second access process to the first access process, the management device 18 can detect the writing having a high degree of locality in the nonvolatile memory unit 16.

Meanwhile, in the embodiments and the modification examples, the first memory unit 14 can be, for example, a static random access memory (SRAM) in the processor. Alternatively, the first memory unit 14 can be a nonvolatile memory such as an MRAM having a greater writable count than the nonvolatile memory unit 16.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device configured to control reading and writing of data as performed by a processing circuit with respect to a nonvolatile memory including a plurality of pages, each of the plurality of pages including a plurality of second areas, the management device comprising:
   a counter memory configured to store a counter table in which, for each of the plurality of pages, a counter value indicating a writing count for the page is stored;
   a management device memory configured to store a management table in which management information for each of a predetermined number of pages that is smaller than the plurality of pages is storable, the management information indicating whether each of a plurality of second areas in a concerned page is in a data-written state or a data-unwritten state; and
   circuitry configured to:
   in response to a request from the processing circuit, perform writing or reading with respect to the nonvolatile memory;
   in response to writing with respect to the nonvolatile memory, update the counter table;
   detect writing having a high degree of locality representing writing operation performed to an extent equal to or greater than a reference value, with respect to the same area in the nonvolatile memory by referring to the counter table; and
   identify an area under attack in which the writing having the high degree of locality is performed, wherein
   in response to writing of first data in the nonvolatile memory,
      when a state of a target second area which represents a second area in which the first data is to be written, the state being specified in the management information regarding a target page representing a page in which the first data is to be written, is the data-unwritten state, the circuitry switches the state to the data-written state, and
      when the state of the target second area as specified in the management information is the data-written state, the circuitry switches a state of the target second area to data-written state, switches states of second areas other than the target second area to the data-unwritten state, and updates the counter value for the target page, and
   the circuitry detects updating of the counter value stored in the counter table, and identifies a page under attack.

2. The device according to claim 1, wherein the circuitry detects consecutive writing performed with respect to the same area a number of times equal to or greater than a reference count, and
   identifies, as the area under attack, an area in which consecutive writing occurs a number of times equal to or greater than the reference count.

3. The device according to claim 1, wherein the circuitry detects writing performed with respect to the same area a number of times equal to or greater than a reference count within a predetermined period of time, and
   identifies, as the area under attack, an area in which writing occurs a number of times equal to or greater than the reference count within the predetermined period of time.

4. The device according to claim 3, wherein the circuitry is further configured to implement wear levelling with respect to the nonvolatile memory, wherein
   at every timing of implementing the wear levelling, the circuitry detects occurrence of writing in the same area performed a number of times equal to or greater than the reference count within the predetermined period of time.

5. The device according to claim 1, wherein
when the management information regarding the target page is not present in the management table, the circuitry performs a management information generation process, and
in the management information generation process,
when there is an unused entry in the management table, the circuitry writes the management information regarding the target page in the unused entry,
when there is no unused entry in the management table, the circuitry deletes the management information written in one of in-use entries and writes the management information regarding the target page, and
the circuitry updates the counter value regarding a page that was managed using the deleted management information.

6. The device according to claim 1, wherein
the management information contains addresses that are stored in the processing circuit and that are managed by a translation lookaside buffer (TLB) storing correspondence relationship information indicating correspondence between logical addresses in a page and physical addresses in order to enable address conversion from virtual addresses to physical addresses,
the management table includes the same number of entries as a number of entries in the TLB, and
the circuitry updates entries in the management table in synchronization with updating of entries in the TLB.

7. The device according to claim 1, wherein
the management device further controls reading and writing of data by the processing circuit with respect to a first memory that has a greater writable count than the nonvolatile memory, and
the circuitry is further configured to, when the writing having a high degree of locality is detected, move target data stored in the area under attack in the nonvolatile memory to the first memory.

8. The device according to claim 1, wherein the circuitry is further configured to, when the writing having the high degree of locality is detected, stop writing in the area under attack.

9. The device according to claim 1, wherein the circuitry is further configured to, when the writing having the high degree of locality is detected, notify the processing circuit about occurrence of the writing having the high degree of locality.

10. The device according to claim 9, wherein, when a notification about being subjected to unauthorized access is received from the processing circuit, the circuitry stops accessing the nonvolatile memory.

11. A management device configured to control reading and writing of data as performed by a processing circuit with respect to a first memory and with respect to a nonvolatile memory including a plurality of pages, each of the plurality of pages including a plurality of second areas, the management device comprising:
a counter memory configured to store a counter table in which, for each of the plurality of pages, a counter value indicating a writing count for the page is stored;
a management device memory configured to store a management table in which management information for each of a predetermined number of pages that is smaller than the plurality of pages is storable, the management information indicating whether each of a plurality of second areas in a concerned page is in a data-written state or a data-unwritten state; and
circuitry configured to:
for each of the plurality of pages, assign an access method indicating which of a first access process in which writing and reading is performed with respect to data transferred from the nonvolatile memory to the first memory, and a second access process in which writing and reading is performed directly with respect to data stored in the nonvolatile memory, is to be performed;
perform the first access process when a write request or a read request is received with respect to a page set to the first access process;
perform the second access process when a write request or a read request is received with respect to a page set to the second access process;
in response to writing with respect to the nonvolatile memory, update the counter table;
detect, by referring to the counter table, writing having a high degree of locality representing writing operation performed to an extent equal to or greater than a reference value, with respect to the same area in a plurality of pages to which the second access process is assigned; and
identify a page under attack in which the writing having the high degree of locality is performed, wherein
in response to writing of first data in the nonvolatile memory by the second access process,
when a state of a target second area which represents a second area in which the first data is to be written, the state being specified in the management information regarding a target page representing a page in which the first data is to be written, is the data-unwritten state, the circuitry switches the state to the data-written state, and
when the state of the target second area as specified in the management information is the data-written state, the circuitry switches a state of the target second area to data-written state, switches states of second areas other than the target second area to the data-unwritten state, and updates the counter value for the target page, and
the circuitry detects updating of the counter value stored in the counter table, and identifies a page under attack.

12. The device according to claim 11, wherein the circuitry is further configured to, when the writing having a high degree of locality is performed, change access method for the page under attack from the second access process to the first access process.

13. An information processing device comprising:
the processing circuit;
the nonvolatile memory; and
the management device according to claim 1.

* * * * *